(12) United States Patent
Brown et al.

(10) Patent No.: US 8,144,582 B2
(45) Date of Patent: *Mar. 27, 2012

(54) DIFFERENTIATING BLADE DESTINATION AND TRAFFIC TYPES IN A MULTI-ROOT PCIE ENVIRONMENT

(75) Inventors: Aaron C. Brown, Austin, TX (US); Douglas M. Freimuth, New York, NY (US); Renato J. Recio, Austin, TX (US); Steven M. Thurber, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 72 days.

This patent is subject to a terminal disclaimer.

(21) Appl. No.: 12/346,251

(22) Filed: Dec. 30, 2008

(65) Prior Publication Data

US 2010/0165874 A1 Jul. 1, 2010

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/56* | (2006.01) |

(52) U.S. Cl. ............... 370/230.1; 370/231; 370/235; 370/392; 370/395.31; 370/395.43

(58) Field of Classification Search .......... None
See application file for complete search history.

(56) References Cited

U.S. PATENT DOCUMENTS

| | | | |
|---|---|---|---|
| 4,115,854 | A | 9/1978 | Capowski et al. |
| 5,379,297 | A | 1/1995 | Glover et al. |
| 5,479,407 | A | 12/1995 | Ko et al. |
| 6,005,851 | A | 12/1999 | Craddock et al. |
| 6,247,080 | B1 | 6/2001 | Wallach et al. |
| 6,262,976 | B1 | 7/2001 | McNamara |
| 6,594,712 | B1 | 7/2003 | Pettey et al. |
| 6,618,380 | B1 | 9/2003 | Mehta et al. |
| 6,633,580 | B1 | 10/2003 | Torudbakken et al. |

(Continued)

OTHER PUBLICATIONS

U.S. Appl. No. 11/940,357.

(Continued)

*Primary Examiner* — Nishant Divecha
(74) *Attorney, Agent, or Firm* — Stephen J. Walder, Jr.; Matthew B. Talpis

(57) ABSTRACT

Mechanisms for differentiating traffic types per host system blade in a multi-root PCI Express environment are provided. The mechanisms generate a first mapping data structure that, for each single-root virtual hierarchy in the multi-root data processing system, associates a plurality of traffic classes with a plurality of priority groups and maps each traffic class in the plurality of traffic classes to a corresponding virtual channel in a plurality of virtual channels. Moreover, a second mapping data structure is generated that maps each virtual channel in the plurality of virtual channels to corresponding per host system blade virtual links in a plurality of virtual links of the multi-root data processing system. Traffic of a particular priority group is routed from a single-root virtual hierarchy to a particular virtual link in the plurality of the virtual links based on the first mapping data structure and second mapping data structure.

18 Claims, 13 Drawing Sheets

U.S. PATENT DOCUMENTS

| | | | |
|---|---|---|---|
| 6,775,790 B2 | 8/2004 | Reuter et al. | |
| 6,842,857 B2 | 1/2005 | Lee et al. | |
| 7,047,372 B2 | 5/2006 | Zeitler et al. | |
| 7,093,024 B2 | 8/2006 | Craddock et al. | |
| 7,260,661 B2 | 8/2007 | Bury et al. | |
| 7,530,071 B2 | 5/2009 | Billau et al. | |
| 7,613,847 B2 | 11/2009 | Kjos et al. | |
| 7,694,047 B1 | 4/2010 | Alston | |
| 7,716,662 B2 | 5/2010 | Seiden | |
| 7,734,859 B2 | 6/2010 | Daniel et al. | |
| 2002/0152371 A1 | 10/2002 | Lee et al. | |
| 2003/0005068 A1 | 1/2003 | Nickel et al. | |
| 2003/0051021 A1 | 3/2003 | Hirschfeld et al. | |
| 2004/0003063 A1 | 1/2004 | Ashok et al. | |
| 2004/0158834 A1 | 8/2004 | Ham et al. | |
| 2004/0181625 A1 | 9/2004 | Armstrong et al. | |
| 2004/0210678 A1 | 10/2004 | Pettey et al. | |
| 2005/0005062 A1 | 1/2005 | Liu et al. | |
| 2005/0034027 A1 | 2/2005 | Hamilton et al. | |
| 2005/0071363 A1 | 3/2005 | Chen et al. | |
| 2005/0071446 A1 | 3/2005 | Graham et al. | |
| 2005/0071514 A1 | 3/2005 | Anderson et al. | |
| 2005/0114555 A1 | 5/2005 | Errickson et al. | |
| 2005/0129040 A1 | 6/2005 | Kiel et al. | |
| 2005/0149651 A1 | 7/2005 | Doak et al. | |
| 2005/0182788 A1 | 8/2005 | Arndt et al. | |
| 2005/0198641 A1 | 9/2005 | Eilam et al. | |
| 2005/0240932 A1 | 10/2005 | Billau et al. | |
| 2005/0246453 A1 | 11/2005 | Erlingsson et al. | |
| 2005/0268047 A1 | 12/2005 | Aslot et al. | |
| 2005/0268052 A1 | 12/2005 | Hepkin et al. | |
| 2006/0085794 A1 | 4/2006 | Yokoyama | |
| 2006/0123111 A1 | 6/2006 | Dea et al. | |
| 2006/0174087 A1 | 8/2006 | Hashimoto et al. | |
| 2006/0195663 A1 | 8/2006 | Arndt et al. | |
| 2006/0206655 A1 | 9/2006 | Chappell et al. | |
| 2006/0218322 A1 | 9/2006 | Hoese et al. | |
| 2006/0218372 A1 | 9/2006 | Ward | |
| 2006/0221832 A1 | 10/2006 | Muller et al. | |
| 2006/0236063 A1 | 10/2006 | Hausauer et al. | |
| 2006/0239287 A1* | 10/2006 | Johnsen et al. | 370/412 |
| 2006/0242330 A1 | 10/2006 | Torudbakken et al. | |
| 2006/0250945 A1 | 11/2006 | Fernandes et al. | |
| 2006/0281630 A1 | 12/2006 | Bailey et al. | |
| 2007/0011272 A1 | 1/2007 | Bakke et al. | |
| 2007/0061441 A1 | 3/2007 | Landis et al. | |
| 2007/0067366 A1 | 3/2007 | Landis | |
| 2007/0174850 A1 | 7/2007 | El Zur | |
| 2007/0192466 A1 | 8/2007 | Nahum | |
| 2007/0192518 A1 | 8/2007 | Rupanagunta et al. | |
| 2007/0244937 A1 | 10/2007 | Flynn, Jr. et al. | |
| 2008/0091746 A1 | 4/2008 | Hatasaki et al. | |
| 2008/0133709 A1 | 6/2008 | Aloni et al. | |
| 2008/0155169 A1 | 6/2008 | Hiltgen et al. | |
| 2009/0006710 A1* | 1/2009 | Daniel et al. | 710/315 |
| 2009/0113430 A1 | 4/2009 | Riley | |
| 2009/0119087 A1 | 5/2009 | Ang et al. | |
| 2009/0133016 A1 | 5/2009 | Brown et al. | |
| 2009/0133028 A1 | 5/2009 | Brown et al. | |
| 2009/0144731 A1 | 6/2009 | Brown et al. | |
| 2009/0276773 A1 | 11/2009 | Brown et al. | |
| 2010/0146170 A1 | 6/2010 | Brown et al. | |
| 2010/0165874 A1 | 7/2010 | Brown et al. | |

OTHER PUBLICATIONS

U.S. Appl. No. 11/949,419.

U.S. Appl. No. 12/114,989.

U.S. Appl. No. 12/330,578.

Office Action from China Patent Office dated Apr. 29, 2010 for Application No. 200810176301.4, 7 pages.

Brown, Aaron C. et al., "Differentiating Traffic Types in a Multi-Root PCI Express Environment", U.S. Appl. No. 12/330,578, filed Dec. 9, 2008.

Final Office Action mailed Aug. 24, 2010 for U.S. Appl. No. 12/114,989; 34 pages.

Interview Summary mailed Oct. 12, 2010 for U.S. Appl. No. 12/330,578; 3 pages.

Response to Office Action filed with the USPTO on Oct. 8, 2010 for U.S. Appl. No. 12/330,578, 15 pages.

Interview Summary mailed Apr. 18, 2011 for U.S. Appl. No. 12/114,989; 3 pages.

Office Action mailed May 25, 2011 for U.S. Appl. No. 11/940,357; 53 pages.

Office Action mailed Jun. 21, 2011 for U.S. Appl. No. 11/949,419; 49 pages.

Response to Office Action filed with the USPTO on Apr. 4, 2011 for U.S. Appl. No. 12/114,989, 37 pages.

Notice of Allowance mailed Nov. 16, 2010 for U.S. Appl. No. 12/330,578; 5 pages.

Office Action mailed Jan. 3, 2011 for U.S. Appl. No. 12/114,989; 26 pages.

Preliminary Amendment filed with the USPTO on Nov. 17, 2010 for U.S. Appl. No. 12/114,989; 33 pages.

Supplemental Notice of Allowability mailed Feb. 8, 2011 for U.S. Appl. No. 12/330,578; 3 pages.

Interview Summary dated Aug. 26, 2011 for U.S. Appl. No. 11/940,357; 16 pages.

Office Action mailed Jul. 15, 2011 for U.S. Appl. No. 12/114,989; 26 pages.

Response to Office Action filed with the USPTO on Aug. 25, 2011 for U.S. Appl. No. 11/940,357; 36 pages.

Response to Office Action filed with the USPTO on Sep. 21, 2011 for U.S. Appl. No. 11/949,419, 31 pages.

* cited by examiner

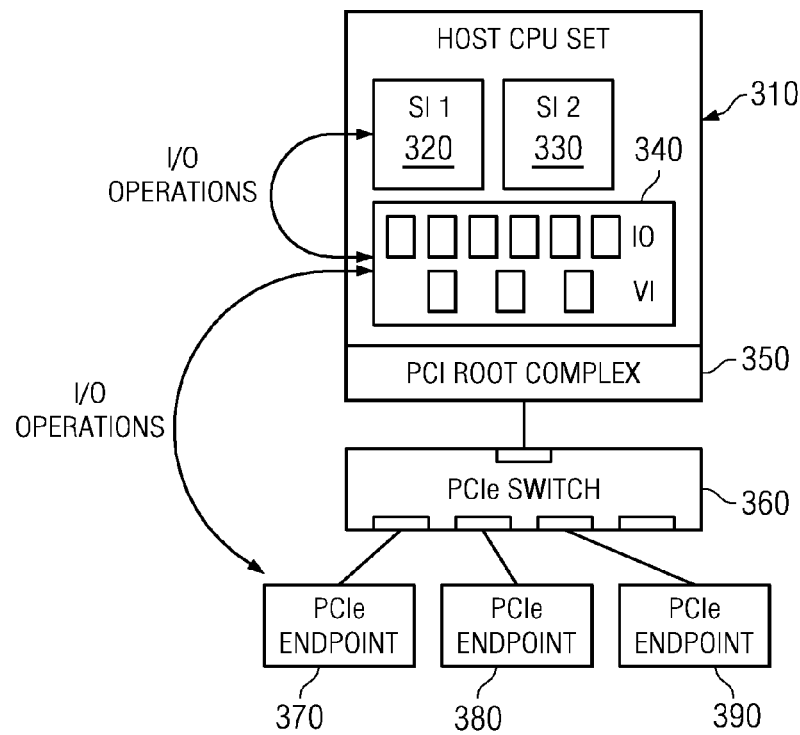
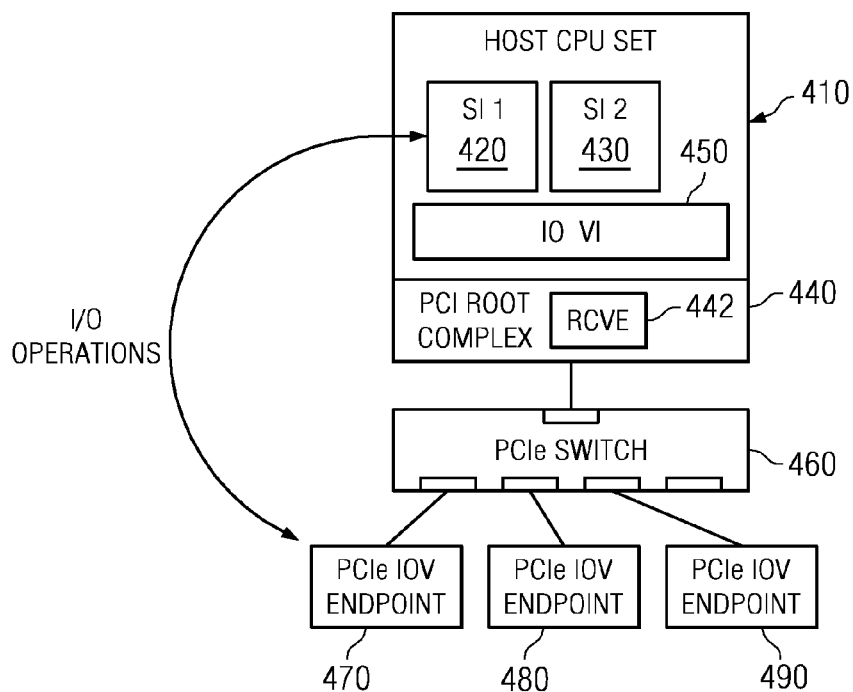

|  1310  |  1320  |  1330  |  1340  |
|---|---|---|---|
| VC | VH | TC | PRIORITY GROUP |
| VC3 | VH1 | TC7 | HPC |
| VC2 | VH1 | TC6 | LAN |
| VC1 | VH1 | TC5 | SAN |
| VC0 | VH1 | TC4 | MANAGEMENT |
| VC3 | VH1 | TC3 | HPC |
| VC2 | VH1 | TC2 | LAN |
| VC1 | VH1 | TC1 | SAN |
| VC0 | VH1 | TC0 | MANAGEMENT |

*FIG. 13*

|  1410  |  1420  |  1430  |  1440  |
|---|---|---|---|
| VC | VH | VL | PRIORITY GROUP |
| VC3 | VH1 | VL10 | HPC |
| VC2 | VH1 | VL7 | LAN |
| VC1 | VH1 | VL4 | SAN |
| VC0 | VH1 | VL1 | MANAGEMENT |
| VC3 | VH2 | VL11 | HPC |
| VC2 | VH2 | VL8 | LAN |
| VC1 | VH2 | VL5 | SAN |
| VC0 | VH2 | VL2 | MANAGEMENT |
| VC3 | VH3 | VL12 | HPC |
| VC2 | VH3 | VL9 | LAN |
| VC1 | VH3 | VL6 | SAN |
| VC0 | VH3 | VL3 | MANAGEMENT |

*FIG. 14*

VC ENABLE

| bit 31 | 30 | 27 26 | VC ID | 24 23 | 20 19 | 17 16 | 15 | 8 7 | TC/VC MAP 0 |
|---|---|---|---|---|---|---|---|---|---|
| 1 | ReservedP | | 000 | | ReservedP | | | ReservedP | 00010001 |
| 1 | | | 001 | | | | | | 00100010 |
| 1 | | | 010 | | | | | | 01000100 |
| 1 | | | 011 | | | | | | 10001000 |

FIG. 15

| | | | |
|---|---|---|---|
| | 2:0 | 100 | VC0 VL MAP |
| 1610 | 3 | | ReservedP |
| | 4 | 1 | VC0 VL MAP ENABLE |
| 1620 | 7:5 | | ReservedP |
| | 10:8 | 101 | VC1 VL MAP |
| 1630 | 11 | | ReservedP |
| | 12 | 1 | VC1 VL MAP ENABLE |
| 1640 | 15:13 | | ReservedP |
| | 18:16 | 110 | VC2 VL MAP |
| 1650 | 19 | | ReservedP |
| | 20 | 1 | VC2 VL MAP ENABLE |
| 1660 | 23:21 | | ReservedP |
| | 26:24 | 111 | VC3 VL MAP |
| 1670 | 27 | | ReservedP |
| | 28 | 1 | VC3 VL MAP ENABLE |

FIG. 16

DIFFERENTIATING BLADE DESTINATION AND TRAFFIC TYPES IN A MULTI-ROOT PCIE ENVIRONMENT

BACKGROUND

The present invention relates generally to an improved data processing system and method. More specifically, the present invention is directed to a system and method for differentiation of traffic types across root complexes in a multi-root PCI Express environment with the differentiation based on both the traffic type and server blade destination. The differentiation will prevent one traffic class from blocking the flow of another traffic class across multi-root systems.

Most modern computing devices make use of input/output (I/O) adapters and buses that utilize some version or implementation of the Peripheral Component Interconnect standard, which was originally created by Intel in the 1990s. The Peripheral Component Interconnect (PCI) standard specifies a computer bus for attaching peripheral devices to a computer motherboard. PCI Express, or PCIe, is an implementation of the PCI computer bus that uses existing PCI programming concepts, but bases the computer bus on a completely different and much faster serial physical-layer communications protocol. The physical layer consists, not of a bi-directional bus which can be shared among a plurality of devices, but of single uni-directional links, which are connected to exactly two devices.

SUMMARY

In one illustrative environment, a method, in a multi-root data processing system, is provided for differentiation between different traffic types and server blade destination. The method comprises generating a first mapping data structure that, for each single-root virtual hierarchy in the multi-root data processing system, associates a plurality of traffic classes with a plurality of priority groups and maps each traffic class in the plurality of traffic classes to a corresponding virtual channel in a plurality of virtual channels. The method further comprises generating a second mapping data structure that maps each virtual channel in the plurality of virtual channels to corresponding per host blade virtual link in a plurality of virtual links of the multi-root data processing system. Moreover, the method comprises routing traffic of a particular priority group from a single-root virtual hierarchy to a particular virtual link in the plurality of the virtual links based on the first mapping data structure and second mapping data structure.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 3 is an example diagram illustrating a first approach for virtualizing I/O of a PCI root complex using a virtualization layer;

FIG. 4 is an example diagram illustrating a second approach for virtualizing I/O of a PCI root complex using natively shared PCI I/O adapters;

FIG. 13 is an example diagram illustrating the hardware maintenance console mapping of a single hierarchy SR-IOV traffic class (TC) to virtual channel (VC) mapping in accordance with one illustrative embodiment;

FIG. 14 is an example diagram illustrating the hardware maintenance console mapping of virtual channels (VCs) to virtual links to priority groups per host blade in accordance with one illustrative embodiment;

FIG. 15 is an example diagram illustrating the TC/VC map in the VC Resource Control Register for the individual SR-IOV systems in accordance with one illustrative embodiment;

FIG. 16 is an example diagram illustrating the MR-IOV device function table with the virtual channel to virtual link mappings from FIG. 14 in accordance with one illustrative embodiment.

DETAILED DESCRIPTION

Figure 1:
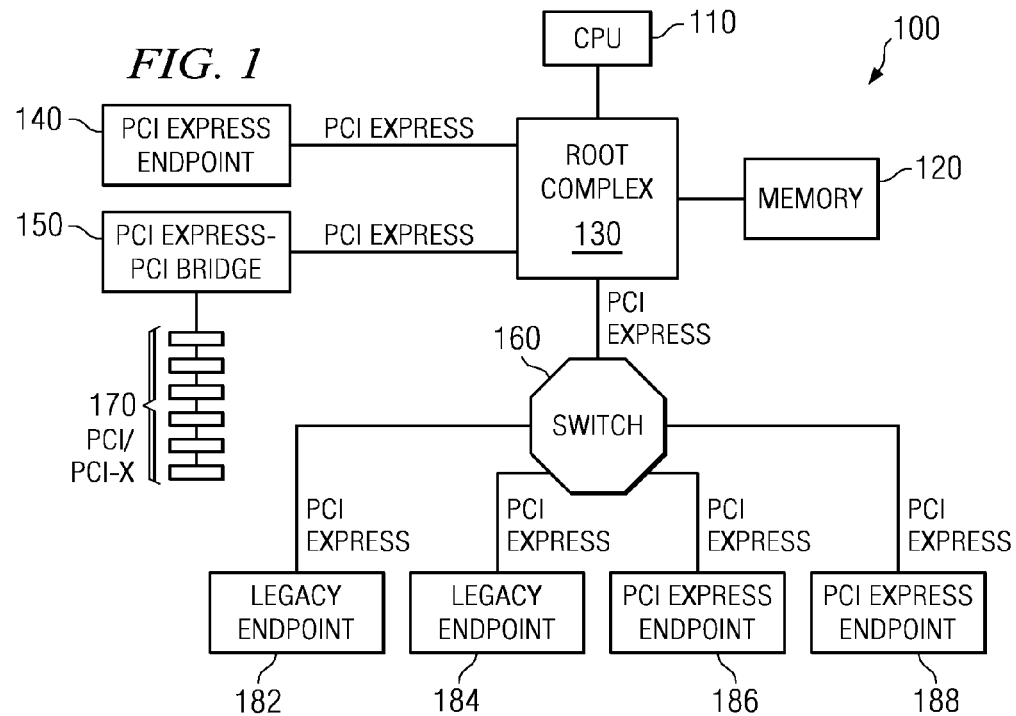
FIG. 1 is an example diagram illustrating a system incorporating a PCIe fabric topology as is generally known in the art.

The peripheral component interconnect special interest group (PCI-SIG) has developed peripheral component interconnect (PCI) and PCI Express (PCIe) specifications for dictating the manner by which PCI and PCIe are to be implemented in data processing systems. FIG. 1 is an example diagram illustrating a system incorporating a PCI Express (PCIe) fabric topology in accordance with the PCIe specification. As shown in FIG. 1, the system 100 is comprised of a host processor (CPU) 110 and memory 120 coupled to a root complex 130, which is in turn coupled to one or more of a PCIe endpoint 140 (the term "endpoint" is used in the PCIe specification to refer to PCIe enabled I/O adapters), a PCI express to PCI bridge 150, and one or more interconnect switches 160. The root complex 130 denotes the root of an I/O hierarchy that connects the CPU/memory to the I/O adapters. The root complex 130 includes a host bridge, zero or more root complex integrated endpoints, zero or more root complex event collectors, and one or more root ports. Each root port supports a separate I/O hierarchy. The I/O hierarchies may be comprised of a root complex 130, zero or more interconnect switches 160 and/or bridges 150 (which comprise a switch or PCIe fabric), and one or more endpoints, such as endpoints 140, 170 and 182-188. For more information regarding PCI and PCIe, reference is made to the PCI and PCIe specifications available from the peripheral component interconnect special interest group (PCI-SIG) website at www.pcisig.com.

In addition to the PCI and PCIe specifications, the PCI-SIG has also defined input/output virtualization (IOV) standards for defining how to design an I/O adapter (IOA) which can be shared by several logical partitions (LPARs). Sharing an IOA on a single root system is called Single Root IO Virtualization (SR-IOV) and sharing an IOA across multi-root systems (e.g. blade system) is called Multi-root IO Virtualization (MR-IOV). An LPAR is a division of a computer's processors, memory, and storage into multiple sets of resources so that each set of resources can be operated independently with its own operating system instance and applications. The number of logical partitions that can be created depends on the system's processor model and resources available. Typically, partitions are used for different purposes such as database operation, client/server operation, to separate test and production environments, or the like. Each partition can communicate with the other partitions as if the other partition is in a separate machine. In modern systems that support LPARs, some resources may be shared amongst the LPARs. As mentioned above, in the PCI and PCIe specification, one such resource that may be shared is the I/O adapter using I/O virtualization mechanisms.

While the PCI-SIG provides a standard for defining how to design an IOA which can be shared by several LPARs in an SR-IOV or MR-IOV environment, this specification does not define how to prevent head of line blocking of different traffic classes and different host blades for all traffic in the separate virtual hierarchies of a multi-root system. The PCIe Multi-root I/O Virtualization (MR-IOV) specification includes details of virtual channel to virtual link mapping which enables the creation of multiple independent data flows and resources across a system. However, the MR-IOV specification does not provide the details on how to prevent head of line blocking in a virtual link across virtual hierarchies for different traffic classes. The MR-IOV specification states "Thus, in general, the MR-PCIM has no a priori knowledge of which VC IDs will be used or how they will be allocated by software operating in the VH. In systems where the MR-PCIM possesses this knowledge or in which the MR-PCIM can communicate a desired allocation to software operating in the VH, VC IDs may be mapped to VLs during MR-PCIM initialization (i.e. prior to the instantiation of software operating in the VH)." Thus, the specification does not provide any method of how to prevent head of line blocking across virtual hierarchies (VHs) in a virtual link. The specification does describe bypass queues which could help prevent head of line blocking but eventually those bypass queues will run out of buffer resources. This results in head of line blocking and additional latency in traffic queuing processes due to the use of the bypass queues.

The illustrative embodiments define mechanisms to differentiate traffic across virtual hierarchies using a traffic class to virtual channel to virtual link mapping capability, where virtual links provide support for multiple independent logical data flows over a single physical Multi-Root (MR) PCIe link and play the same role in an MR topology as virtual channels (VCs) in a PCIe Base topology. Virtual channels enable creation of multiple independent flows in the PCI Express single-root hierarchy. Virtual links enable the creation of multiple independent flows in the PCI Express multi-root hierarchy. Each virtual hierarchy of the multi-root system may assign a single virtual channel to a virtual link. Multiple traffic types sharing a single virtual link could result in head of line blocking. For example, the storage traffic could block the high performance computing (HPC) traffic, i.e. traffic associated with supercomputers and clusters, on a virtual link. Further the storage traffic might be from a different virtual hierarchy than the HPC traffic. Thus traffic with longer transfer times could block traffic that requires lower latency. The slower traffic blocking the virtual link could be from a different virtual hierarchy resulting in the work for one system blocking the traffic targeted for another system. The illustrative embodiments define a mechanism to assign priority groups to traffic classes, virtual channels, and virtual links in order to prevent slower traffic, such as storage traffic, from blocking more latency sensitive traffic, such as HPC application traffic.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Since the illustrative embodiments define a mechanism to differentiate traffic types across virtual hierarchies using virtual channel to virtual link mappings, in order to understand the mechanisms of the illustrative embodiments, it is important to first understand how I/O virtualization may be implemented in a system utilizing a hypervisor or other virtualization platform. It should be appreciated that while the illustrative embodiments will be described with regard to Peripheral Component Interconnect Express (PCIe) adapters or endpoints, the present invention is not limited to such. Rather, the mechanisms of the illustrative embodiments may be implemented in any I/O fabric that supports I/O virtualization within the I/O adapters. Moreover, it should be appreciated that while the illustrative embodiments will be described in terms of an implementation in which a hypervisor is utilized, the present invention is not limited to such. To the contrary, other types of virtualization platforms other than a hypervisor, whether implemented in software, hardware, or any combination of software and hardware, currently known or later developed, may be used without departing from the spirit and scope of the present invention.

Figure 2:
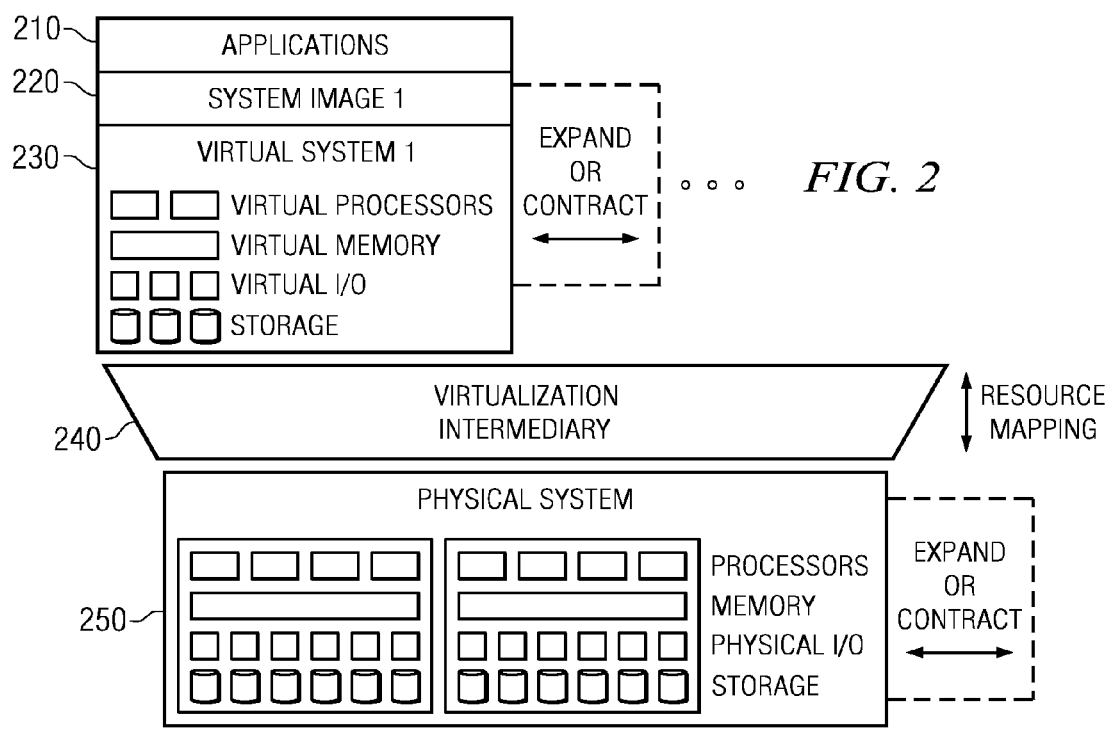
FIG. 2 is an example diagram illustrating system virtualization as is generally known in the art.

FIG. 2 is an example diagram illustrating system virtualization as is generally known in the art. System virtualization is the division of a physical system's processors, memory, I/O adapters, storage, and other resources where each set of resources operates independently with its own system image instance and applications. In such system virtualization, virtual resources are composed from physical resources and operate as proxies for physical resources, e.g., memory, disk drives, and other hardware components with architected interfaces/functions, having the same external interfaces and functions. System virtualization typically utilizes a virtualization layer which creates virtual resources and maps them to the physical resources thereby providing isolation between virtual resources. The virtualization layer is typically provided as one of, or a combination of, software, firmware, and hardware mechanisms.

As shown in FIG. 2, typically in a virtualized system, an application 210 communicates with a system image (SI) 220 which is a software component, such as a general or special purpose operating system, with which specific virtual and physical resources are assigned. The system image 220 is associated with a virtual system 230 which is comprised of the physical or virtualized resources necessary to run a single SI instance, e.g., virtualized processors, memory, I/O adapters, storage, etc.

The system image 220, via the use of the virtual system 230, accesses physical system resources 250 by way of the virtualization layer 240. The virtualization layer 240 manages the allocation of resources to a SI and isolates resources assigned to a SI from access by other SIs. This allocation and isolation is often performed based on a resource mapping performed by the virtualization layer 240 and one or more resource mapping data structures maintained by the virtualization layer 240.

Such virtualization may be used to allow virtualization of I/O operations and I/O resources. That is, with regard to I/O virtualization (IOV), a single physical I/O unit may be shared by more than one SI using the virtualization layer 240 which may be partially or wholly implemented as a hypervisor. The hypervisor may be software, firmware, or the like, that is used to support IOV by intervening on, for example, one or more of configuration, I/O, and memory operations from a SI, and direct memory access (DMA), completion, and interrupt operations to a SI.

FIG. 3 is an example diagram illustrating a first approach to virtualizing I/O of a PCI root complex using a virtualization layer. As shown in FIG. 3, a host processor set 310, which may be one or more processors of a chip, motherboard, blade, or the like, may support a plurality of system images 320-330 through which applications (not shown) may access system resources, such as PCIe endpoints 370-390. The system images communicate with the virtualized resources via the virtualization layer 340, PCIe root complex 350, and one or more PCIe switches 360, and/or other PCIe fabric elements.

With the approach illustrated in FIG. 3, the virtualization layer 340, which may be implemented partially or wholly as a hypervisor or other type of virtualization platform, is involved in all I/O transactions and performs all I/O virtualization functions. For example, the virtualization layer 340 multiplexes I/O requests from the various SI's I/O queues onto a single queue in the PCIe endpoints 370-390. Thus, the virtualization layer 340 acts as a proxy between the SIs 320-330 and the physical PCIe endpoints 370-390.

FIG. 4 is an example diagram illustrating a second approach to virtualizing I/O of a PCI root complex using natively shared PCI I/O adapters. As shown in FIG. 4, a host processor set 410, which may be one or more processors of a chip, motherboard, blade, or the like, may support a plurality of system images 420-430 through which applications (not shown) may access system resources, such as PCIe I/O virtualization (IOV) endpoints 470-490. The system images 420-430 communicate with the virtualized resources via the PCIe root complex 440 and one or more PCIe switches 460, and/or other PCIe fabric elements.

The PCIe root complex 440 includes root complex virtualization enablers (RCVE) 442 which may comprise one or more address translation and protection table data structures, interrupt table data structures, and the like, that facilitate the virtualization of I/O operations with IOV enabled endpoints 470-490. The address translation and protection table data structures may be used by the PCIe root complex 440 to perform address translation between virtual and real addresses for virtualized resources, control access to virtual resources based on a mapping of virtual resources to SIs, and other virtualization operations, for example. These root complexes interrupt table data structures are accessible through the PCIe memory address space and are used to map interrupts to appropriate interrupt handlers associated with SIs, for example.

As with the approach shown in FIG. 3, a virtualization layer 450 is provided in the virtualization structure of FIG. 4 as well. The virtualization layer 450 is used with non-IOV enabled PCIe endpoints that may be coupled to the PCIe switch 460. That is, the virtualization layer 450, which may be partially or wholly implemented as a hypervisor or other virtualization platform, is utilized with PCIe endpoints in a similar manner as described previously above with regard to FIG. 3 for those PCIe endpoints that do not have native, i.e. internal to the endpoint, support for I/O virtualization (IOV).

For IOV enabled PCIe endpoints 470-490, the virtualization layer 450 is used primarily for configuration transaction purposes and is not involved in memory address space operations, such as memory mapped input/output (MMIO) operations initiated from a SI or direct memory access (DMA) operations initiated from the PCIe endpoints 470-490. To the contrary, data transfers between the SIs 420-430 and the endpoints 470-490 are performed directly without intervention by the virtualization layer 450. Direct I/O operations between the SIs 420-430 and the endpoints 470-490 is made possible by way of the RCVEs 442 and the built-in I/O virtualization logic, e.g., physical and virtual functions, of the IOV enabled PCIe endpoints 470-490. The ability to perform direct I/O operations greatly increases the speed at which I/O operations may be performed, but requires that the PCIe endpoints 470-490 support I/O virtualization.

Figure 5:
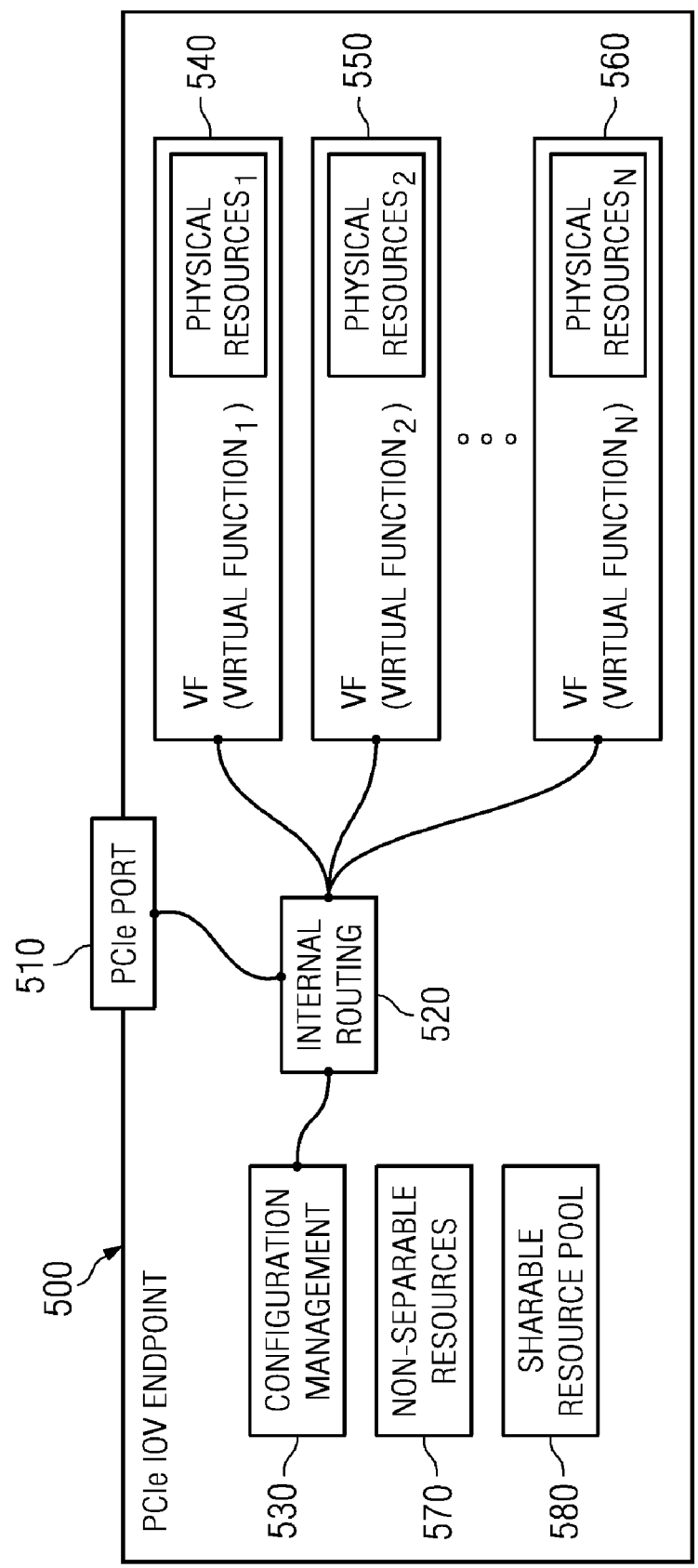
FIG. 5 is an example diagram of a PCIe I/O virtualization enabled endpoint.

FIG. 5 is an example diagram of a PCIe I/O virtualization (IOV) enabled endpoint. As shown in FIG. 5, the PCIe IOV endpoint 500 includes a PCIe port 510 through which communications with PCIe switches, and the like, of a PCIe fabric may be performed. Internal routing 520 provides communication pathways to a configuration management function 530 and a plurality of virtual functions (VFs) 540-560. The configuration management function 530 may be a physical function (PF) as opposed to the virtual functions 540-560. A physical "function," as the term is used in the PCI specifications, is a set of logic that is represented by a single configuration space. In other words, a physical "function" is circuit logic that is configurable based on data stored in the function's associated configuration space in a memory, such as may be provided in the non-separable resources 570, for example.

The configuration management function 530 may be used to configure the virtual functions 540-560. The virtual functions are functions, within an I/O virtualization enabled endpoint, that share one or more physical endpoint resources, e.g. a link, and which may be provided in the sharable resource pool 580 of the PCIe IOV endpoint 500, for example, with another function. The virtual functions can, without run-time intervention by a hypervisor, directly be a sink for I/O and memory operations from a system image, and be a source of Direct Memory Access (DMA), completion, and interrupt operations to a system image (SI).

PCIe adapters/endpoints may have many different types of configurations with regard to the "functions" supported by the PCIe adapters/endpoints. For example, endpoints may support a single physical function (PF), multiple independent PFs, or even multiple dependent PFs. In endpoints that support native I/O virtualization, each PF supported by the endpoints may be associated with one or more virtual functions (VFs), which themselves may be dependent upon VFs associated with other PFs. Example relationships between physical and virtual functions will be illustrated in FIGS. 6 and 7 hereafter.

Figure 6:
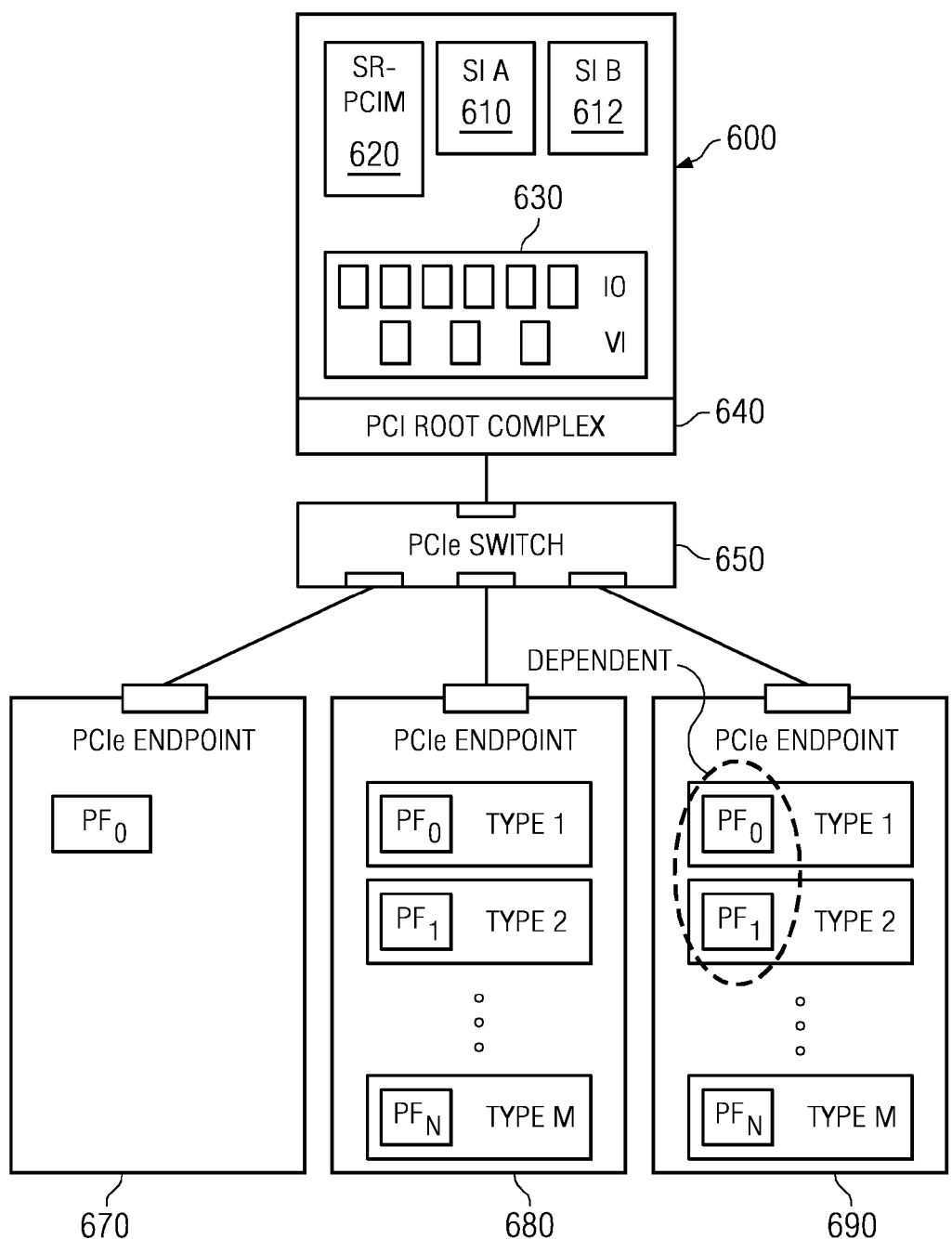
FIG. 6 is an example diagram illustrating physical and virtual functions of single root endpoints without native virtualization.

FIG. 6 is an example diagram illustrating physical and virtual functions of single root endpoints without native virtualization. The term "single root endpoints" refers to an endpoint that is associated with a single root complex of a single root node, i.e. a single host system. With a single root endpoint, the endpoint may be shared by a plurality of system images (SIs) associated with a single root complex, but cannot be shared among a plurality of root complexes on the same or different root nodes.

As shown in FIG. 6, the root node 600 includes a plurality of system images 610, 612, which communicate with PCIe endpoints 670-690, an I/O virtualization intermediary 630 (which is used as previously described), PCIe root complex 640, and one or more PCIe switches 650 and/or other PCIe fabric elements. The root node 600 further includes a single root PCIe configuration management (SR-PCIM) unit 620. The SR-PCIM unit 620 is responsible for managing the PCIe fabric, which includes the root complex 640, the one or more PCIe switches 650, and the like, and the endpoints 670-690. The management responsibilities of SR-PCIM 620 include determination of which functions are to be assigned to which SIs 610, 612 and the setup of the configuration space of the endpoints 670-690. The SR-PCIM 620 may configure the functions of the various endpoints 670-690 based on a SI's capabilities and input from a user, such as a system administrator, or load balancing software as to which resources are to be assigned to which SIs 610, 612. A SI's capabilities may include various factors including how much address space is available to allocate to the endpoint 670-690, how many interrupts are available to be assigned to the endpoint 670-690, and the like.

Each of the PCIe endpoints 670-690 may support one or more physical functions (PFs). The one or more PFs may be independent of each other or may be dependent upon each other in some fashion. A PF may be dependent upon another PF based on vendor defined function dependencies wherein one PF requires the operation of another PF or the result generated by another PF, for example, in order to operate properly. In the depicted example, PCIe endpoint 670 supports a single PF and PCIe endpoint 680 supports a plurality of independent PFs, i.e. $PF_0$ to $PF_N$, of different types 1 to M. A type relates to the functionality of the PF or VF, e.g., an Ethernet function and a Fiber Channel function are two different types of functions. Endpoint 690 supports multiple PFs of different types with two or more of the PFs being dependent. In the depicted example, $PF_0$ is dependent upon $PF_1$, or vice versa.

In the example shown in FIG. 6, the endpoints 670-690 are shared by the system images (SIs) 610 and 612 through the virtualization mechanisms made available by the I/O virtualization intermediary (IOVI) 630. As described previously, in such an arrangement, the IOVI 630 is involved in all PCIe transactions between the SIs 610, 612 and the PCIe endpoints 670-690. The individual PCIe endpoints 670-690 need not support virtualization in themselves since the burden of handling the virtualization is placed entirely on the IOVI 630. As a result, while known mechanisms for virtualization may be used in such an arrangement, the rate by which I/O operations may be performed is relatively slow compared to the potential for I/O rates if the IOVI 630 were not involved in every I/O operation.

Figure 7:
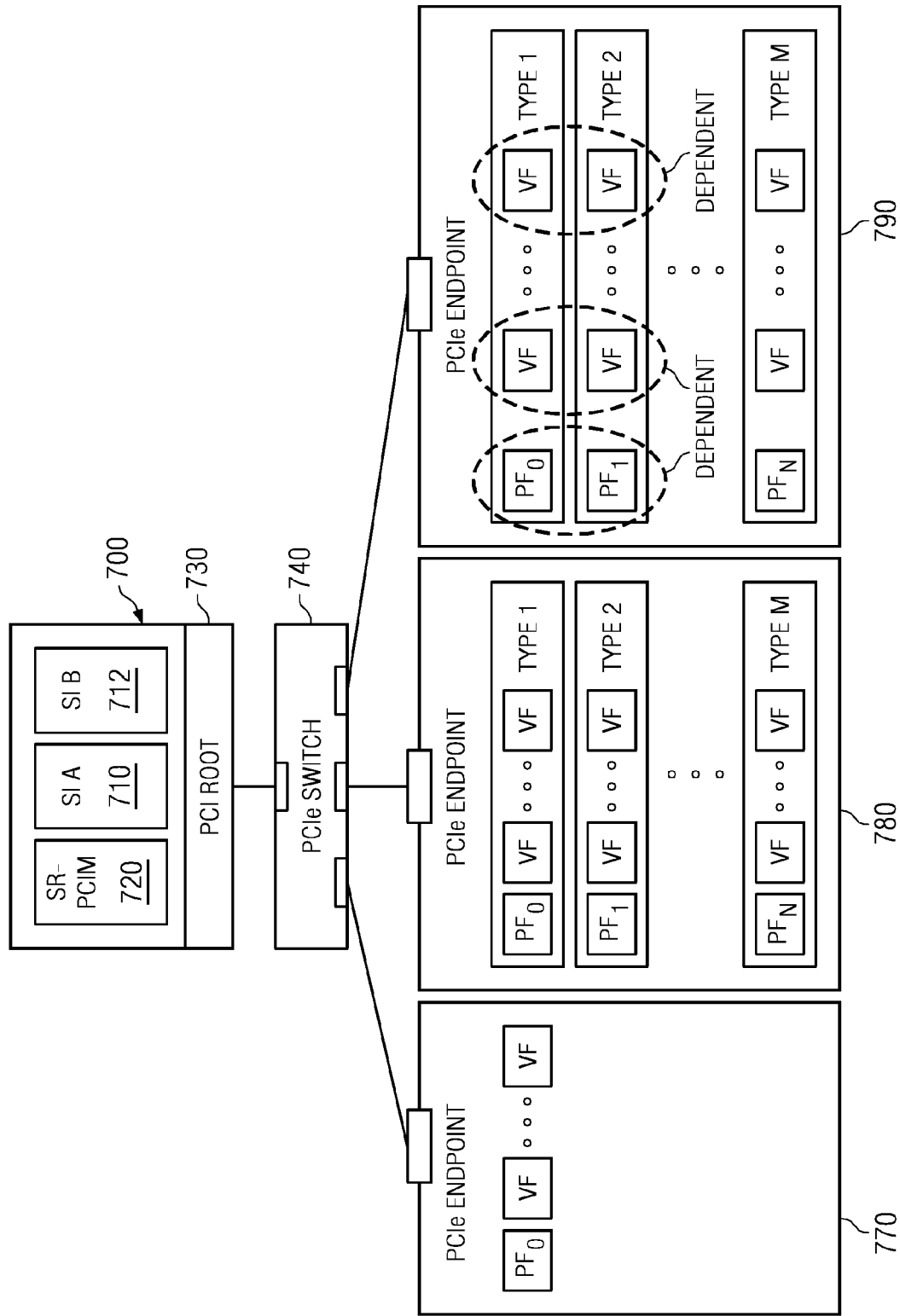
FIG. 7 is an example diagram illustrating physical and virtual functions of single root endpoints enabled for native I/O virtualization.

FIG. 7 is an example diagram illustrating physical and virtual functions of single root endpoints enabled for native I/O virtualization. The arrangement shown in FIG. 7 is similar to that of FIG. 6 with some important differences due to the PCIe endpoints 770-790 supporting I/O virtualization (IOV) natively, i.e. within the endpoints themselves. As a result, the I/O virtualization intermediary 630 in FIG. 6 may be effectively eliminated, except of course for configuration operations, with regard to the IOV enabled PCIe endpoints 770-790. However, if non-IOV enabled PCIe endpoints (not shown) are also utilized in the arrangement, e.g., legacy endpoints, an I/O virtualization intermediary may be used in conjunction with the elements shown in FIG. 7 to handle sharing of such non-IOV enabled PCIe endpoints between the system images 710 and 712.

As shown in FIG. 7, the IOV enabled PCIe endpoints 770-790 may support one or more independent or dependent physical functions (PFs) which in turn may be associated with one or more independent or dependent virtual functions (VFs). In this context, the PFs are used by the SR-PCIM 720 to manage a set of VFs and are also used to manage endpoint functions, such as physical errors and events. The configuration spaces associated with the PFs define the capabilities of the VFs including the maximum number of VFs associated with the PF, combinations of the PFs and VFs with other PFs and VFs, and the like.

The VFs are used by SIs to access resources, e.g., memory spaces, queues, interrupts, and the like, on the IOV enabled PCIe endpoints 770-790. Thus, a different VF is generated for each SI 710, 712 which is going to share a specific PF. VFs are generated by the endpoint 770-790 based on the setting of the number of VFs by the SR-PCIM 720 in the configuration space of the corresponding PF. In this way, the PF is virtualized so that it may be shared by a plurality of SIs 710, 712.

As shown in FIG. 7, the VFs and PFs may be dependent upon other VFs and PFs. Typically, if a PF is a dependent PF, then all of the VFs associated with that PF will also be dependent. Thus, for example, the VFs of the $PF_0$ may be dependent upon corresponding VFs of $PF_1$.

With the arrangement shown in FIG. 7, the SIs 710, 712 may communicate directly, via the PCI root complex 730 and PCIe switch 740, with the IOV enabled PCIe endpoints 770-790 and vice versa without the need for involvement by an I/O virtualization intermediary. Such direct communication is made possible by virtue of the IOV support provided in the endpoints 770-790 and in the SR-PCIM 720, which configures the PFs and VFs in the endpoints 770-790.

The direct communication between the SIs and the endpoints greatly increases the speed at which I/O operations may be performed between a plurality SIs 710, 712 and shared IOV enabled PCIe endpoints 770-790. However, in order for such performance enhancements to be made possible, the PCIe endpoints 770-790 must support I/O virtualization by providing mechanisms in the SR-PCIM 720 and the physical functions (PFs) of the endpoints 770-790 for generating and managing virtual functions (VFs).

The above illustrations of a PCIe hierarchy are limited to single root hierarchies. In other words, the PCIe endpoints are only shared by SIs 710, 712 on a single root node 700 associated with a single PCI root complex 730. The mechanisms described above do not provide support for multiple root complexes sharing the PCIe endpoints. Thus, multiple root nodes cannot be provided with shared access to the resources of a PCIe endpoint. This limits the scalability of systems utilizing such arrangements since a separate set of endpoints is required for each root node.

The illustrative embodiments herein may make use of multi-root I/O virtualization in which multiple PCI root complexes may share access to the same set of IOV enabled PCIe endpoints. As a result, the system images associated with each of these PCI root complexes may each share access to the same set of IOV enabled PCIe endpoint resources but with the protections of virtualization being in place for each SI on each root node. Thus, scalability is maximized by providing a mechanism for allowing addition of root nodes and corresponding PCI root complexes which may share the same existing set of IOV enabled PCIe endpoints.

Figure 8:
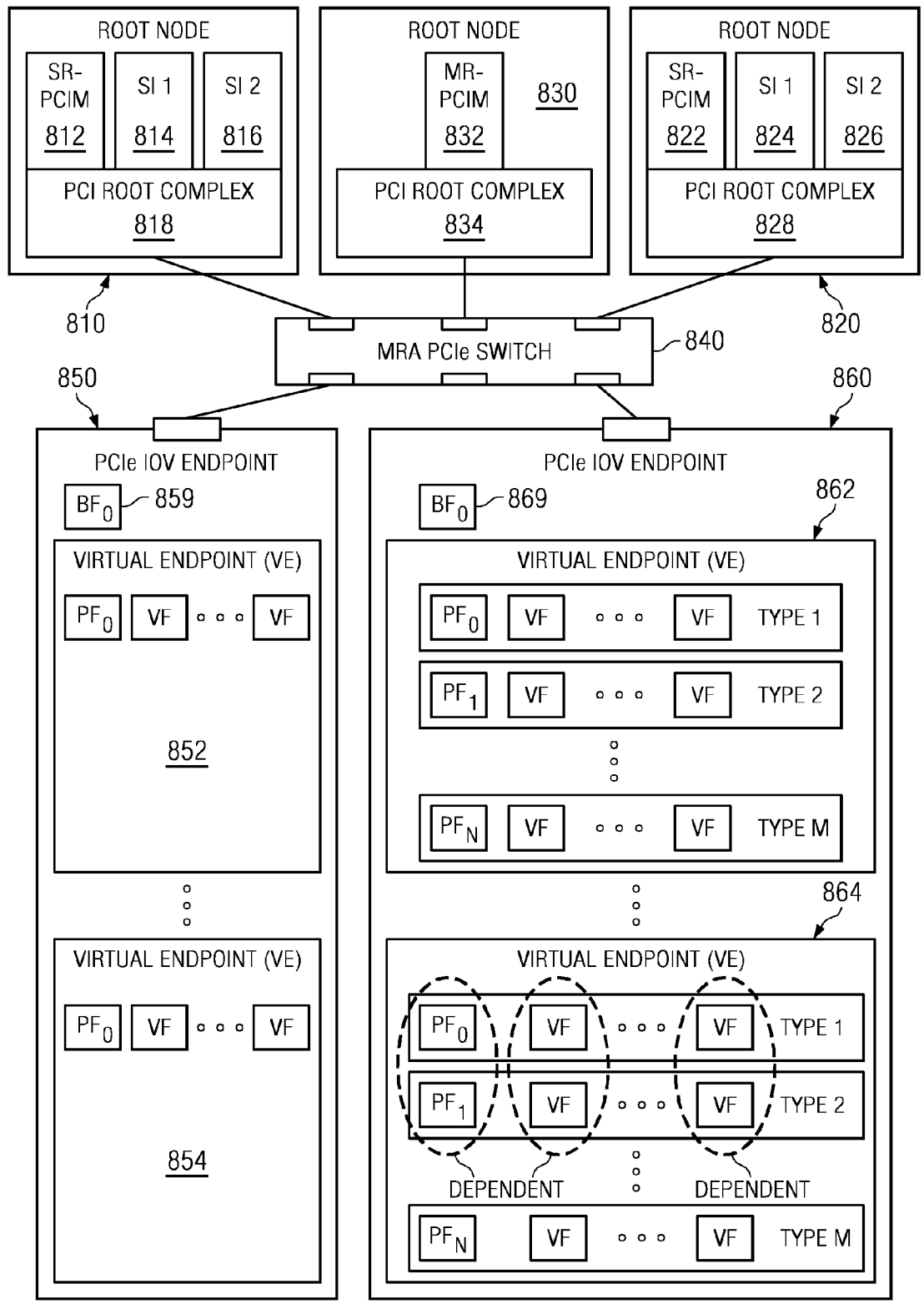
FIG. 8 is an example diagram illustrating a multi-root virtualized I/O topology in accordance with one illustrative embodiment.

FIG. 8 is an example diagram illustrating a multi-root virtualized I/O topology in accordance with one illustrative embodiment. As shown in FIG. 8, a plurality of root nodes 810 and 820 are provided with each root node having a single root PCI configuration manager (SR-PCIM) 812, 822, one or more system images (SIs) 814, 816, 824, and 826, and a PCI root complex 818 and 828. These root nodes 810 and 820, which may be, for example, blades in a blade server, are coupled to one or more multi-root aware (MRA) PCIe switches 840 of a PCIe switch fabric which may include one or more such MRA PCIe switches 840, and/or other PCIe fabric elements. The MRA switch 840 is of a different type than the non-MRA switch 740 in FIG. 7 in that the MRA switch 840 has connections for additional root nodes and contains the mechanisms required for keeping the address spaces of those different root nodes separate and distinct.

In addition to these root nodes 810 and 820, a third root node 830 is provided that includes a multi-root PCI configuration manager (MR-PCIM) 832 and corresponding PCI root complex 834. The MR-PCIM 832 is responsible for discovering and configuring virtual hierarchies within the multi-root (MR) topology shown in FIG. 8, as will be discussed in greater detail hereafter. Thus, the MR-PCIM 832 configures the physical and virtual functions of the endpoints with regard to multiple root complexes of multiple root nodes. The SR-PCIMs 812 and 822 configure the physical and virtual functions of their associated single root complex. In other words, the MR-PCIM sees the MR topology as a whole, while the SR-PCIM sees only its own virtual hierarchy within the MR topology, as described in greater detail hereafter.

As shown in FIG. 8, the IOV enabled PCIe endpoints 850 and 860 support one or more virtual endpoints (VEs) 852, 854, 862, and 864. A VE is a set of physical and virtual functions assigned to a root complex. Thus, for example, a separate VE 852 and 862 are provided on the IOV enabled PCIe endpoints 850 and 860 for the PCI root complex 818 of root node 810. Similarly, a separate VE 854 and 864 are provided on the IOV enabled PCIe endpoints 850 and 860 for the PCI root complex 828 of root node 820.

Each VE is assigned to a virtual hierarchy (VH) having a single root complex as the root of the VH and the VE as a terminating node in the hierarchy. A VH is a fully functional PCIe hierarchy that is assigned to a root complex or SR-PCIM. It should be noted that all physical functions (PFs) and virtual functions (VFs) in a VE are assigned to the same VH.

Each IOV enabled PCIe endpoint 850 and 860 supports a base function (BF) 859 and 869. The BF 859, 869 is a physical function used by the MR-PCIM 832 to manage the VEs of the corresponding endpoint 850, 860. For example, the BF 859, 869 is responsible for assigning functions to the VEs of the corresponding endpoints 850, 860. The MR-PCIM 832 assigns functions to the VEs by using the fields in the BF's configuration space that allows assignment of a VH number to each of the PFs in the endpoint 850, 860. In the illustrative embodiments, there can be only one BF per endpoint, although the present invention is not limited to such.

As shown in FIG. 8, each VE 852, 854, 862, and 864 may support their own set of physical and virtual functions. As described previously, such sets of functions may include independent physical functions, dependent physical functions, and their associated independent/dependent virtual functions. As shown in FIG. 8, VE 852 supports a single physical function ($PF_0$) with its associated virtual functions (VFs). VE 854 likewise supports a single physical function ($PF_0$) with its associated virtual functions (VFs). VE 862 supports a plurality of independent physical functions ($PF_0$-$PF_N$) and their associated virtual functions (VFs). VE 864, however, supports a plurality of dependent physical functions ($PF_0$-$PF_N$).

A VE 852, 854, 862, or 864 may directly communicate with the SIs 814, 816, 824, and 826 of the root nodes 810 and 820, if and only if the VE is assigned to a VH to which the SI has access, and vice versa. The endpoints 850 and 860 themselves must support single root I/O virtualization, such as described previously above, and multi-root I/O virtualization as described with regard to the present illustrative embodiments. This requirement is based on the fact that the topology supports multiple root complexes but each individual root node sees only its associated single root based virtual hierarchy.

Figure 9:
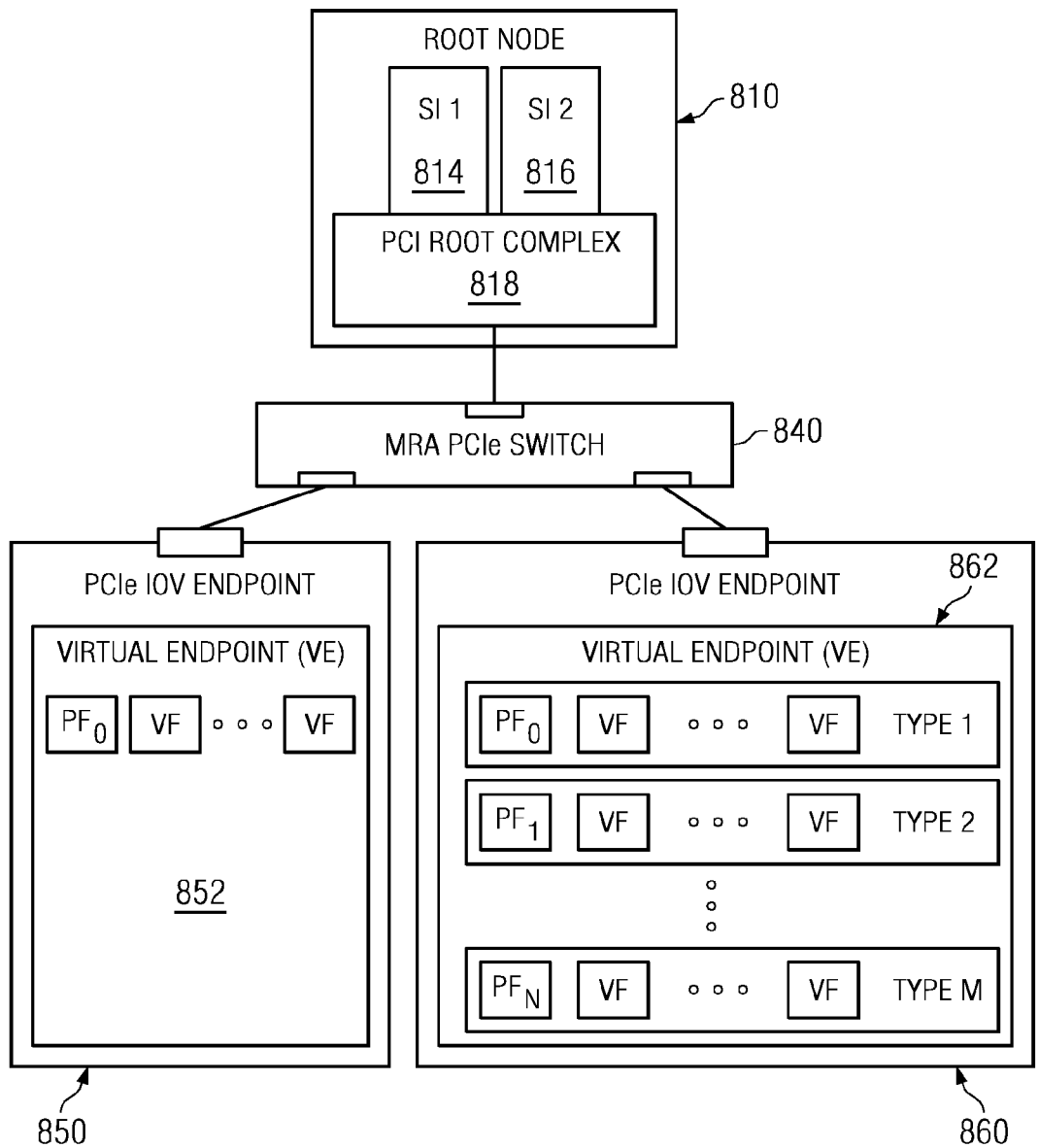
FIG. 9 is an example diagram illustrating a virtual hierarchy view of a multi-root virtualized I/O topology from the viewpoint of a SR-PCIM of a root node in accordance with one illustrative embodiment.

FIG. 9 is an example diagram illustrating a virtual hierarchy view of a multi-root virtualized I/O topology from the viewpoint of a root complex of a root node in accordance with one illustrative embodiment. As shown in FIG. 9, while the multi-root (MR) topology may be as shown in FIG. 8, each root complex of each individual root node views only its portion of the MR topology. Thus, for example, the PCI root complex 818 associated with root node 810 sees its host processor set, its own system images (SIs) 814, 816, the MRA switch 840, and its own virtual endpoints (VEs) 852 and 862. There is full PCIe functionality within this virtual hierarchy, however, the PCI root complex 818 does not see the VEs, root complexes, system images, etc, that are not part of its own virtual hierarchy.

Figure 10:
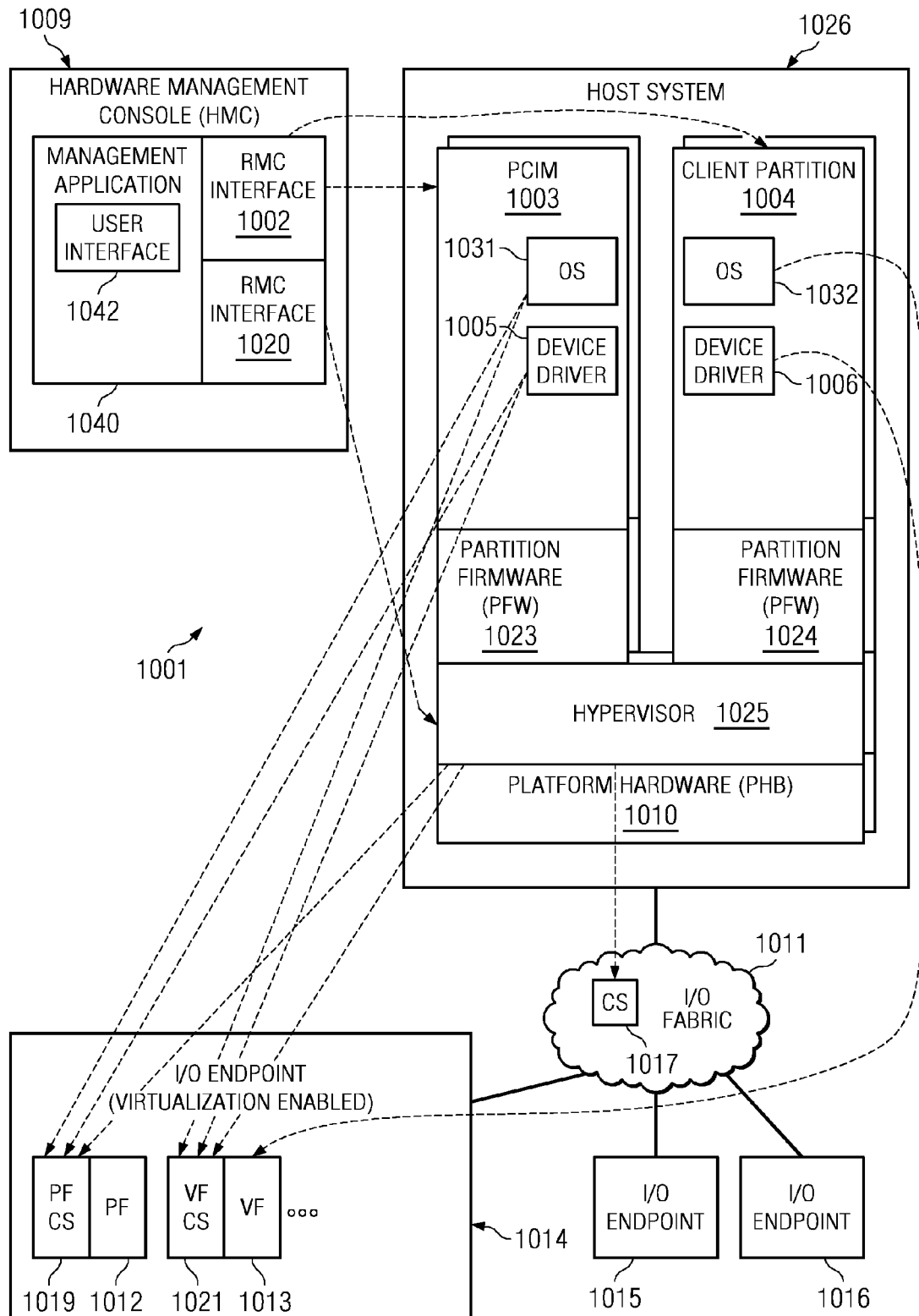
FIG. 10 is an example diagram illustrating a hardware maintenance console (HMC) and PCIM in accordance with one illustrative embodiment.

FIG. 10 is an example diagram of a system structure in which IOV enabled endpoints, or adapters, are utilized in accordance with one illustrative embodiment. The mechanisms shown in FIG. 10 may be implemented in conjunction with the mechanisms illustrated in FIG. 4. For example, the PCI manager (PCIM) 1003 shown in FIG. 10, which may be either a Single Root (SR) or Multiple Root (MR) PCIM, may be provided in association with system image 1 420 in FIG. 4 while client partition 1004 in FIG. 10 may be provided in association with system image 2 430 of FIG. 4. Similarly, the I/O fabric 1011 of FIG. 10 may include the PCIe switch 460 in FIG. 4, IOV endpoint 1014 may be similar to any one of PCIe endpoints 470-490 in FIG. 4, and endpoints 1015 and 1016 may be either IOV enabled endpoints or non-IOV enabled endpoints, such as endpoints 370-390 in FIG. 3.

As shown in FIG. 10, the system 1001 comprises a host system 1026 which may be any data processing device, e.g., a server, client computing device, or the like, an I/O fabric 1011 (e.g., a PCIe fabric) which may include one or more communication links and one or more switches, and one or more I/O endpoints 1014-1016 which may be, in one illustrative embodiment, PCIe I/O endpoints with I/O endpoint 1014 being an I/O virtualization (IOV) enabled endpoint while the other endpoints 1015-1016 may be IOV enabled or non-IOV enabled endpoints. The host system 1026 comprises platform hardware 1010 which is the underlying hardware of the data processing device, a hypervisor 1025, logical partitions (LPARS) 1003 and 1004, and corresponding partition firmware (PFW) 1023 and 1024. While the illustrative embodiments are described herein with regard to use with a hypervisor 1025, it will be appreciated that other types of virtualization platforms may be utilized without departing from the spirit and scope of the present invention as previously mentioned above.

The hypervisor 1025, in one illustrative embodiment, may be code that executes on the platform hardware 1010, and is part of the platform's firmware. Similarly, the partition firmware (PFW) 1023-1024 may also be part of the platform's firmware, but is shown in association with the LPARs 1003 and 1004 since they are logically considered to be part of the LPARs' code executing within the LPAR.

The LPARs 1003 and 1004 have allocated resources and an operating system image or instance that executes within the LPAR. In addition, the LPARs 1003 and 1004 may execute other applications, software, code, or the like within the LPAR. For example, with particular importance to the illustrative embodiment's one of the LPARs, e.g., LPAR 1003, executes code that causes the LPAR 1003 to operate as single root communication fabric manager, e.g., a SR-PCIM, or a multi-root communication fabric manager, e.g., a MR-PCIM 1003 (collectively referred to as simply a "PCIM" hereafter). Other LPARs 1004 may operate as client partitions. While only one PCIM 1003 and one client partition 1004 are shown in FIG. 10, it should be appreciated that more than one PCIM 1003 and client partition 1004 may be provided in a host system 1026 without departing from the spirit and scope of the illustrative embodiments.

The hypervisor 1025 has access to configuration spaces 1019, 1021 of the IOV endpoint 1014 and to the I/O fabric 1011 configuration space 1017. The term "configuration space" as it is used herein refers to a disjoint address space from the memory mapped I/O (MMIO) address space, which is memory on the I/O adapter that is mapped by the host operating system for addressability by the host operating system, which is allocated for use in storing configuration data for a particular component of the system 1001. Further, the PCIM's operating system 1031 and device driver 1005 have access to the configuration space 1019 for the Physical Functions (PFs) 1012 when they are assigned to the PCIM 1003, and have access to the configuration spaces 1021 of the Virtual Functions (VFs) that belong to the PF assigned to the PCIM 1003.

A management application 1040 on a Hardware Management Console (HMC) 1009, which may be resident on the host system 1026 or in a separate data processing device (as shown), and the HMC 1009 itself communicate through a Remote Management Command (RMC) interface 1002 to the PCIM 1003 and client partitions 1004 and through the same type interface 1020 to the hypervisor 1025. The management application 1040 (referred to hereafter collectively with the HMC 1009 as simply the HMC 1009), acts as the orchestrator to control functionality across the various components in the system 1001, and provides a user interface 1042 for a human to view system configurations and to input information about what resources that they want assigned to what LPARs 1003-1004. The management application 1040 may provide many different functions which may be invoked by the user as described in greater detail hereafter. Alternatively, these functions may be automatically invoked without user intervention in response to an event or input triggering the initiation of such functions.

Some of these functions, as will be described hereafter in accordance with the illustrative embodiments, include the generation or establishment of mapping data structures for mapping from traffic classes to virtual channels and virtual channels to virtual links according to priority groupings. Moreover, as discussed hereafter, these functions may further comprise functions for configuring communication fabric managers with these mappings so that they may appropriately route data of various traffic classes and priority groups to appropriate virtual links so as to avoid head of line blocking.

As mentioned above, virtual channels enable creation of multiple independent flows in the PCI Express single-root hierarchy while virtual links enable the creation of multiple independent flows in the PCI Express multi-root hierarchy. Each virtual hierarchy of the multi-root system may assign a single virtual channel to a virtual link. However, multiple traffic types sharing a single virtual link could result in head of line blocking. Thus, traffic with longer transfer times could block traffic that requires lower latency. The illustrative embodiments define a mechanism to assign priority groups to traffic classes, virtual channels, and virtual links in order to prevent slower traffic from blocking more latency sensitive traffic.

Figure 11:
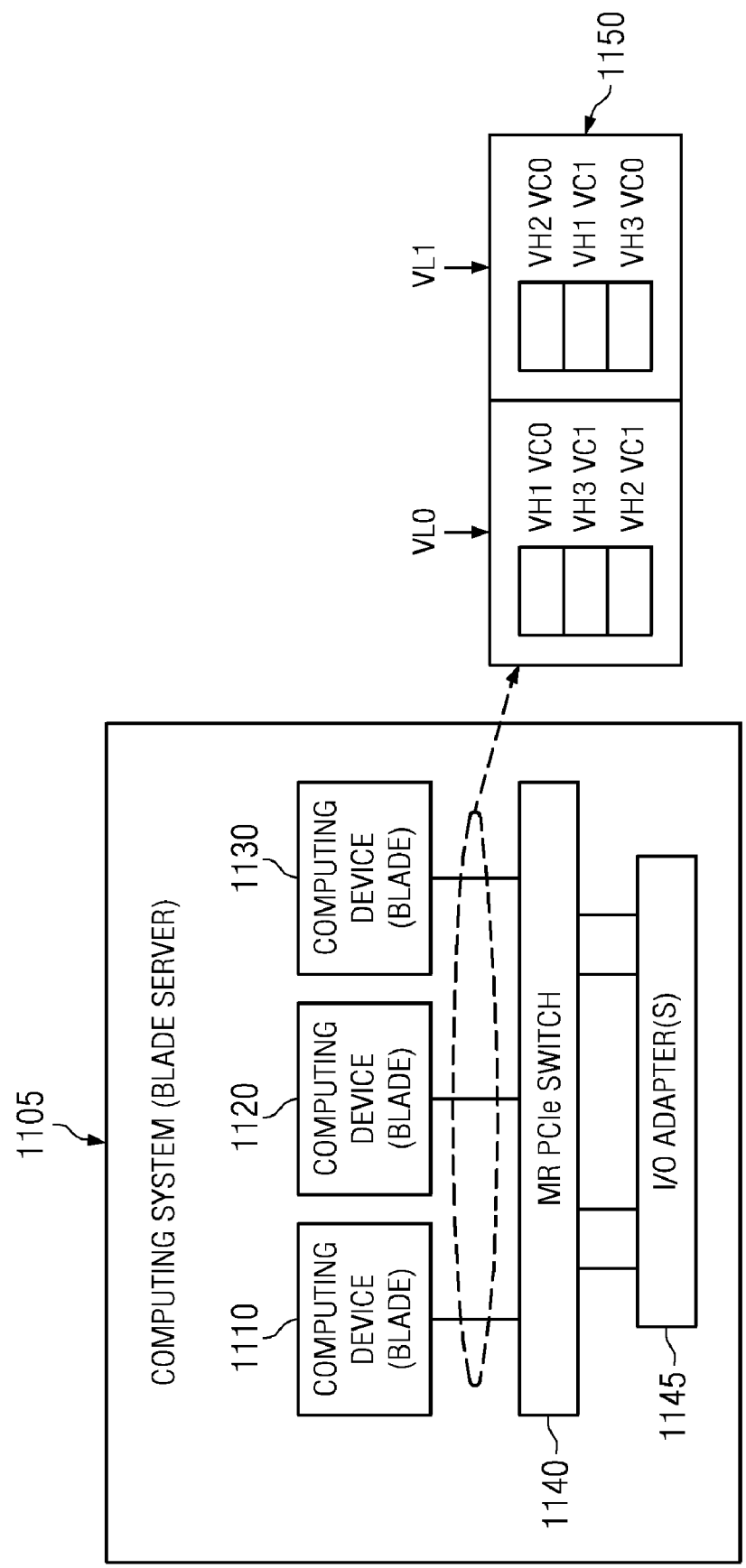
FIG. 11 is an example diagram illustrating virtual links creating head of line blocking across an MR-IOV system.

FIG. 11 is an example diagram illustrating virtual links creating head of line (HOL) blocking across an MR-IOV system. The MR-IOV specification enables virtual channel (VC) to virtual link (VL) mapping as depicted in FIG. 11. For example, as shown in FIG. 11, a first computing device 1110 of the computing system 1105, which in the depicted example is a blade 1110 of a blade server 1105, is associated with, e.g., is a root node of, a first virtual hierarchy (VH) referred to in the figure as VH1. A second computing device 1120 is associated with, e.g., is a root node of, a second virtual hierarchy (VH2) and a third computing device 1130 is associated with a third virtual hierarchy (VH3). The different virtual hierarchies may be associated with different virtual channels (VC0-VC1). Each of the virtual links (VLs), i.e. VL0 and VL1, may communicate data across these VLs in association with the various virtual hierarchies (VHs).

One can see that, without defining priority groups for each VL, an arbitrary placement of VH VC pairs may result with the configuration shown in FIG. 11. That is, the computing devices 1110-1130 of the different virtual hierarchies may transmit data, i.e. traffic, which is to be routed across the virtual links (VLs), which provide logical connections between the MR PCIe switch and the computing devices 1110-1130. Each of the VLs, i.e. VL0 and VL1, may communicate data across these VLs in association with the various virtual hierarchies (VHs). As a result, as shown in box 1150, data from VH1 over VC0, which may be slower traffic requiring more processor cycles to process or having a lower dependency on timeliness of processing than other data, may be routed over the same virtual link, e.g., VL0, as faster traffic requiring a relatively lower number of processor cycles to process, e.g., data traffic over VH3 VC1. That is, for example, HPC traffic may generate small packets that depend upon short latency or response (i.e. faster traffic) while storage traffic may be larger block data that cannot tolerate lossy behavior (i.e. slower traffic). The signature of each traffic class may vary depending on the application environment. For example, HPC data could be large block while storage traffic might be small block.

The fact that slower traffic and faster traffic may be routed over the same virtual link may result in head of line (HOL) blocking of slower traffic VH1 VC0 ahead of faster traffic VH3 VC1 in the buffers of the virtual links (VLs). Additionally, one system or computing device, e.g., blade 1110 associated with the first virtual hierarchy VH1, may essentially block the traffic of another system or computing device, e.g., blade 1130 associated with the third virtual hierarchy VH3. Bypass queues may kick in if HOL blocking occurs, however bypass queue resources are limited and will run out, eventually resulting in HOL blocking. Bypass queues may also result in significant performance overhead from the manner in which they are implemented.

Figure 12:
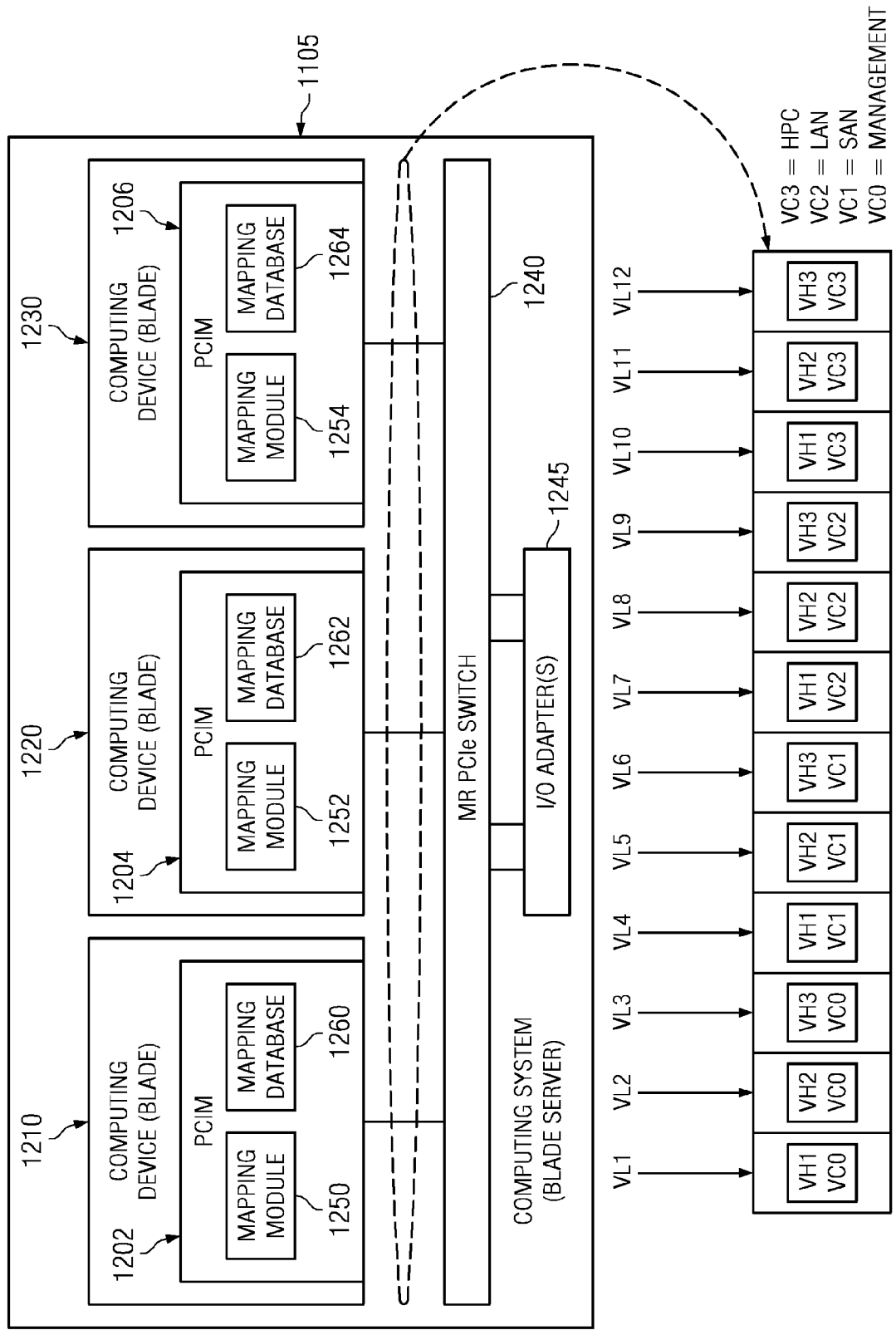
FIG. 12 is an example diagram illustrating the use of traffic classes mapped on per host system blade virtual links to prevent head of line blocking across an MR-IOV system in accordance with one illustrative embodiment.

FIG. 12 is an example diagram of one illustrative embodiment in which traffic classes are mapped on virtual links per host blade to prevent head of line blocking across an MR-IOV system. Association of priority groups with virtual lanes can prevent head of line blocking by placing faster traffic in their own priority group and associating those priority groups with virtual links (VLs). This prevents slower traffic in one priority group from blocking faster traffic in another priority group. Additionally it prevents one host system, or virtual hierarchy (VH), from blocking another host system, or virtual system (VH), when they have differing performance goals. This allows the illustrative embodiments to differentiate traffic based on its priority and also based on the system blade that the traffic is going to. In illustrative embodiments, if a buffer resource becomes congested, then the congestion only affects the specific priority of traffic going to a specific system blade. For example, if a virtual link (VL) associated with a combination of VH1/VC3 becomes congested, then only HPC traffic (VC3) to system blade 1 (VH1) will become congested. One aspect of the illustrative embodiments that is important to note is that the illustrative embodiments provide the ability to implement weighted traffic. For example, if there is one priority of traffic, or one particular system blade, that is more important or more widely used in the system, then more buffer resources can be allocated to that priority of traffic or system blade to ensure that the specific traffic priority group going to a specific blade does not become congested easily.

With the mechanisms of the illustrative embodiments, the PCI managers 1202, 1204, and 1206 in the computing devices 1210-1230, which may constitute the root node of a corresponding virtual hierarchy, which in turn may be system blades of a blade server system for example, are programmed with mapping tables for mapping traffic classes to virtual channels, and ultimately to a virtual link, based on priority of the traffic being transmitted. Thus, the different virtual hierarchies may transmit data, i.e. traffic, which is to be routed across various ones of the virtual channels (VC0-VC3). The VCs of each VH may be associated with a particular priority group, as discussed in greater detail hereafter. The combination of VHs and VCs may in turn be mapped to particular virtual links (VLs), e.g., VL1-VL12.

In the illustrative embodiments, each combination of VH and VC may be mapped to a separate virtual link. Thus, the same VH and VC may be mapped to different traffic classes, such that traffic of different traffic classes may be transmitted/received over the same virtual channel in association with the same virtual hierarchy, but these traffic classes have a same priority group associated with them. Each combination of VH and VC, however, is mapped to a separate virtual link (VL) such that traffic associated with a same priority group may be transmitted over different virtual links based on combination of the virtual hierarchy, or system blade, that the traffic is associated with, and the particular priority of the traffic (which is associating with the virtual channel (VC)).

As shown in FIG. 12, each of the virtual links (VLs) has its own associated combination of VH and VC. Since the VCs correspond to particular priority groups, each VL is thus, associated with a different priority of traffic from a particular VH. Since VHs are associated with particular host systems, or system blades, each VL is associated with a particular host system or system blade, and a particular priority of traffic associated with that host system or system blade. For example, virtual link VL1 is associated with VH1 and VC0, which corresponds to blade 1210 and the priority group "Management." Virtual link VL2 is associated with VH1 and VC0, which corresponds to blade 1220 and the priority group "Management." Similarly, virtual link VL6 is associated with VH3 and VC1, which corresponds to blade 1230 and priority group "SAN." Virtual link VL10 is associated with VH1 and VC3, which corresponds to blade 1210 and priority group "HPC." The other virtual links VLs similarly have different combinations of VH and VC which correspond to different combinations of blades 1210-1230 and priority groups.

Traffic from the various computing devices or systems 1210-1230 may be mapped and routed to the various virtual links VL1 to VL12 based on a traffic class (TC) (for single-root I/O virtualization) or virtual channel (VC) (for multi-root I/O virtualization) of the traffic. Thus, traffic from the computing device 1210 may be routed to any of the virtual links VL1-VL12 of the Multi-Root PCIe switch 1240 by the PCI managers 1202, 1204, and 1206, depending upon the traffic class of the traffic being transmitted. The particular virtual link VL1-VL12 to which the traffic is to routed is determined based on a mapping of the VH of the blade 1210-1230 that is transmitting the data, or traffic, as well as the traffic class (TC) of the traffic. The TC is mapped to a particular VC of the VH of the blade 1210-1230, and the combination of the VC and VH are used to determine which VL to which to route the traffic.

Thus, for example, with single-root I/O virtualization, traffic from blade 1210, i.e. VH1, that has a traffic class (TC) associated with a priority group of "HPC" will be mapped and routed by the PCI manager 1202 to the virtual channel VC3. The combination of VH1 and VC3 corresponds to virtual link VL10 in the depicted example. Similarly, traffic from computing devices, or blades, 1220-1230 having traffic classes associated with the same "HPC" priority group are mapped by their respective PCI managers 1204 and 1206 to the virtual links VL11 and VL12, respectively. Likewise, traffic from each of these computing devices, or blades, 1210-1230 that has a traffic class that is mapped to the other priority groups is mapped and routed by the PCI managers 1202, 1204, and 1206 to the appropriate virtual link VL1-VL9.

As shown in FIG. 12, the PCI managers (PCIMs) 1202-1206, include a mapping module 1250-1254 and a mapping table database 1260-1264. The mapping module 1250-1254 maps traffic passing through the PCIM 1202-1206 based on the virtual hierarchy (VH) and the traffic class (TC) to a virtual channel (VC), and then maps the VC and VH combination to a particular virtual link (VL). The mapping table database 1260-1264 stores the mapping table data that specifies how to map from a traffic class and virtual hierarchy to a virtual channel and ultimately to a priority group or vice versa, map from a virtual channel to a virtual link or vice versa, and the like. As discussed hereafter, the mapping table data that is stored in the mapping table database 1260-1264 may be provided to the PCI managers 1202-1206 by a hardware management console (HMC), such as HMC 1009 in FIG. 10.

The mapping table(s) in the mapping table database 1260-1264 may be used as the basis for a mapping lookup operation performed by the mapping module 1250-1254 of the PCIM 1202-1206 when determining how to map and route traffic from the computing devices, or blades, 1210-1230 to the virtual links VL4 to VL7, for example, or vice versa. Thus, for example, when data flows into the PCIM 1202 from processes executing on the computing device, or blade, 1210, the mapping module 1250 of the PCIM 1202 determines a virtual hierarchy (VH) and traffic class (TC) associated with the data. This determination may be made, for example, based on the configuration data, as described hereafter in FIGS. 15 and 16, in the endpoints and switches. PCI Express packets, associated with the configuration data, have headers that may be tagged with data to implement or otherwise enable the use of the mapping information shown in FIG. 14, described hereafter. This information is used with the mapping table(s) in the mapping table database 1260 to determine a virtual channel (VC) corresponding to the VH and TC. The VC and VH are then used to select a virtual link (VL) associated with that combination of VH and VC over which the data is to be transmitted to the MR PCIe switch 1240. The PCIM 1250 may then route the data corresponding to the traffic from the computing device, or blade, 1210 to the appropriate port of the MR PCIe switch 1240 over the selected virtual link (VL).

In this way, the VC defines the priority group and the priority group is used at a management application layer so that the administrator can properly assign traffic classes (TCs) to VCs and combinations of VHs/VCs to VLs. One cannot just use the VC to VL mappings since, in general, the MR-PCIM has no a priori knowledge of which VC IDs will be used or how they will be allocated by software operating in the VH. Without use of a management application to map the VC into priority groups and the mechanism to configure PCI Express endpoints based on that mapping, as provided by the illustrative embodiments, head of line blocking could result, as discussed above with regard to FIG. 11, when priority groups have been mixed on the same VL, which is allowed by the PCI Express standard.

In one illustrative embodiment, the mapping table(s) may be programmed into the mapping table database 1260-1264 by a privileged user, automated mechanism, or the like, via the hardware management console (HMC), e.g., HMC 1009 in FIG. 10. FIG. 13 is an example diagram illustrating the hardware management console (HMC) mapping of a single hierarchy, e.g., VH1 1320, single-root I/O virtualization (SR-IOV) traffic class (TC) 1330 to virtual channel (VC) 1310 mapping, and subsequently to a priority group 1340. The priority group 1340 spans the single-root and multi-root environments. As shown in FIG. 13, all of the TCs 1330 in one priority group 1340 are assigned to the same virtual channel VC 1310. Thus, for example, for priority group "HPC," traffic classes TC7 and TC3 are assigned to the same virtual channel VC3, for priority group "LAN," traffic classes TC6 and TC2 are assigned to virtual channel VC2, and so on.

Thus, within a single virtual hierarchy (VH), the same virtual channel (VC) corresponds to the same priority group. However, different traffic classes (TCs) may be associated with the same virtual channel (VC). Multiple virtual hierarchies (VHs) may be combined into a multi-root I/O virtualization (MR-IOV) enabled architecture, as previously described above. Thus, in the MR-IOV environment, there may be multiple copies of the table shown in FIG. 13 or these tables may be combined within a single mapping table. However, for each virtual hierarchy, different TCs may be associated with the same VC such that in a first VH, TC7 corresponds to VC1 and in a second VH, TC7 may correspond to VC4. As a result, the same traffic class, e.g., TC7, may correspond to different priority groups in different virtual hierarchies (VHs) due to their different mappings to different virtual channels.

FIG. 14 is an example diagram illustrating the hardware maintenance console mapping of virtual channels to virtual links to priority groups per host system blade in accordance with one illustrative embodiment. This diagram shows how the VCs of the single root environment, VH1, shown in FIG. 13, and VH2 and VH3 are mapped to virtual links in a multi-root environment. Moreover, this diagram shows how the HMC does the mapping for the multi-root environment shown in FIG. 12. This mapping prevents head of line blocking for different priority groups assigned per host blade. Essentially, FIG. 14 is intended to show that each VH, e.g., each physical server, blade, or the like, has its own mapping of TCs to VCs if managed individually but, there is also a global mapping combinations of VHs and VCs to separate VLs. There may be different mappings for each VH, however it is important to properly map them, such as shown in FIG. 14, to separate VLs based on the particular VH and VC so as to avoid head of line blocking by one system, or blade, of another system or blade.

As shown in FIG. 14, in the depicted example, VC3 in each of the VHs is associated with an HPC priority group, however depending upon which VH one is looking at, the HPC priority traffic of that VH is associated with a different VL. Thus, for example, the VC3 traffic for VH1 is associated with VL10 while the VC3 traffic for VH2 is associated with VL11 in the mapping data structure of FIG. 14. It should be appreciated that each combination of VC and VH has a separate VL such that traffic of different priorities are transmitted on different virtual links from each VH. Essentially, traffic of different priorities and different systems or blades are routed, across the multi-root system, based on the specific combination of system/blade and priority of the traffic, e.g., the VC of the traffic. Such routing may be accomplished by virtue of the mapping structures and mechanisms provided by the illustrative embodiments. By placing the different priority traffic from different VHs on separate VLs, head of line blocking between different priority groups on different systems is avoided.

Thus, with the mechanisms of the illustrative embodiments, TCs of a particular VH are mapped to VCs, and the combinations of VHs/VCs are mapped to separate VLs. In this way, the mapping operations, that use the mapping table (s) of the illustrative embodiments, and mechanisms of the illustrative embodiments, prevent head of line blocking for different priority groups and different systems/blades. Head of line blocking is prevented since all traffic of different priority groups and different systems/blades are associated with different virtual links. As a result, the lower priority traffic, higher priority traffic, or even the same priority traffic of a different system/blade cannot cause a performance degradation for traffic on a current system/blade.

FIG. 15 is an example diagram illustrating a TC/VC mapping table data structure for an individual SR-IOV system. This TC/VC mapping table may be stored, for example, in the VC Resource Control Register of the virtual channel extended capability structure described in the PCI Express Base Specification, revision 1.1, page 428, available from the PCI-SIG website. The VC Resource Control allocates VC resources. The TC/VC mapping table data structure describes the mapping of TC to VC for the referenced function (virtual or physical function) or endpoint. An endpoint can have multiple functions and each function can have its own TC/VC map. The physical function is assigned to a single VH. A single function device means the endpoint has one TC/VC map.

Each SR-IOV system represents a virtual hierarchy VH, such as illustrated in FIG. 12 and shown as separate entries in the mapping table data structure of FIG. 14. In the example depicted in FIG. 15, the TC/VC mapping table data structure has been populated with data values to represent the TC/VC mapping illustrated previously in FIG. 13 above. For example, in FIG. 15, the VC ID value "000" corresponds to VC0 and the associated value "00010001" corresponds to TC's 4 and 0, as shown in the table of FIG. 13. The enable bit enables the VC associated with the VC ID for use (see the PCI Express Base Specification, Revision 1.1, page 428 for further information on enabling VCs). The implementation of FIGS. 13 and 14 results in a configuration space being set up on a PCI Express endpoint.

FIG. 16 is an example diagram illustrating the MR-IOV device function table with the virtual channel to virtual link mappings from FIG. 14. The priority group mappings are created using the HMC and passed to the MR-PCIM. The MR-PCIMs configure the device function table with the virtual channel to virtual link mappings from FIG. 14 in accordance with the illustrative embodiments. FIG. 16 represents the manner by which the VC to VL map of the illustrative embodiments is stored in a device function table in the PCI Express configuration space as may be generated by the HMC in accordance with the mechanisms of the illustrative embodiments.

In FIG. 16, the first column represents a bit field pointing to a 32 bit value, such as bits 0 to 31 in FIG. 15. Thus, for example, the bits 2:0 point to a 3 bit value corresponding to the VC0 VL Map, as designated in third column. Bit 3 1610 is reserved in the PCI SIG Multi-Root IO Virtualization 1.0 specification but, in the context of the illustrative embodiments herein, this bit is used to increase the space for addressable virtual links. That is, the VL is used to provide a one-to-one mapping with a VH, VC pair and using 3 bits to specify the VC0 VL Map, only 8 VH, VC pairs are supported. With the mechanisms of the illustrative embodiments, the adjacent reserved bit(s) may be used to expand the bits used to specify the VC VL mapping. Thus, for example, bits 3:0, i.e. adding bit 3 1610, may be utilized to represent the VC VL Map thereby providing a 4 bit value that can support at least 12 VH, VC pairs. Moreover, it should be noted that all of the VCx VL mappings in FIG. 16 have an adjacent reserved bit, 1620-1670, that may be used to increase the VCx VL mapping to 4 bits.

The second column is a hexadecimal value representing the particular VC to VL map, e.g., "0001" corresponds to VC0. The bit 4 is an enable bit for enabling the VC0 VL mapping. Similar bit values are provided for each of the VC1 VL, VC2 VL, and VC3 VL mappings for the VH. The setting of the enable bit indicates whether the corresponding VC to VL mapping is being utilized or not. The table data structure shown in FIG. 16 may be used in conjunction with the other table data structures mentioned above to facilitate a mapping lookup operation by a PCI manager, a switch, or the like, to determine what virtual link to which to route data flowing from a particular host system/blade (e.g., a VH) on a particular VC.

It should be appreciated that the complex mappings represented in FIGS. 13-16 are for only three VHs and that this becomes much more complex when more multiple VHs are utilized in a multi-root system, e.g., up to 256 VHs. In that case additional VCx VL map bits may be required.

Figure 17:
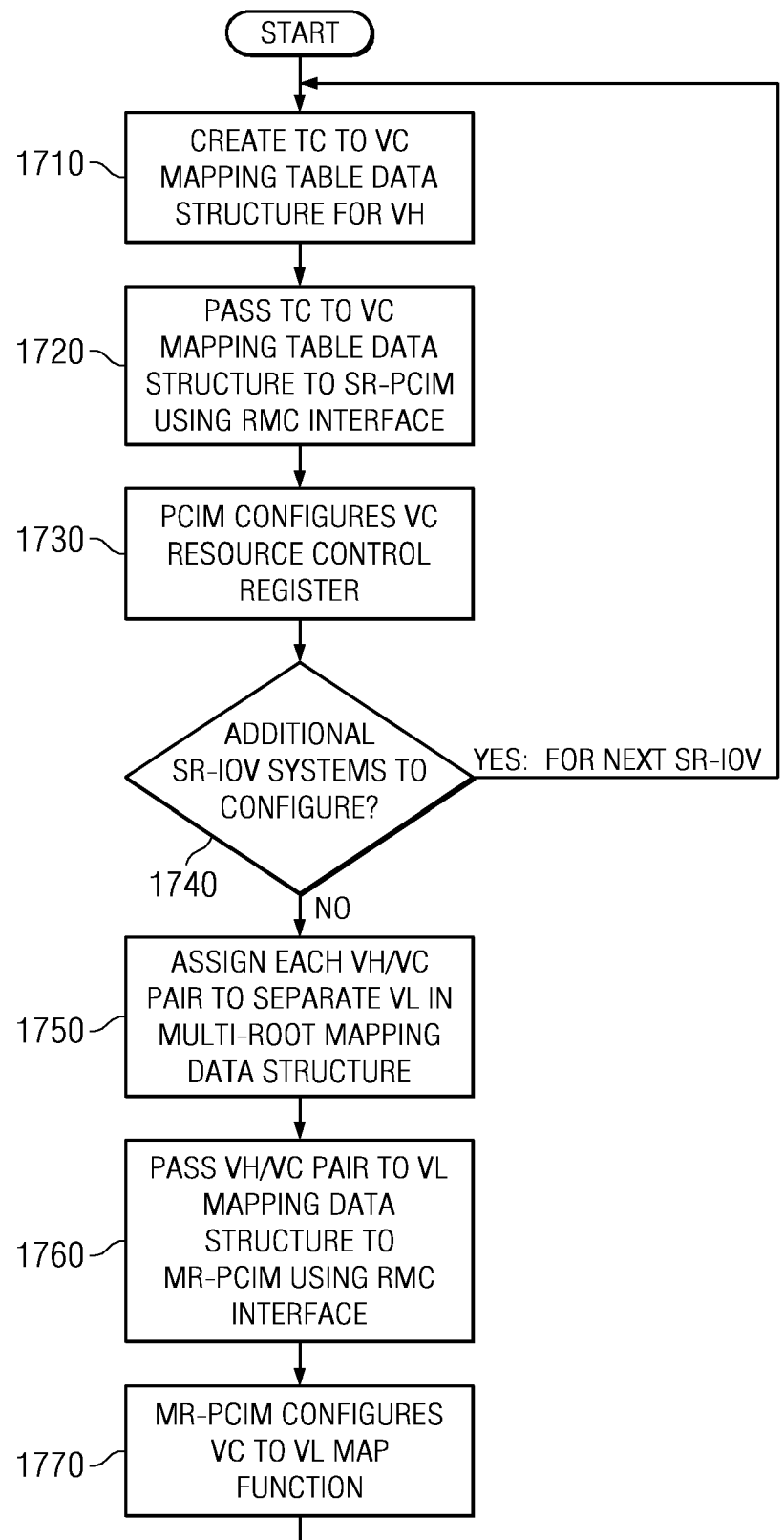
FIG. 17 is a flowchart outlining an example operation for performing priority group mapping and per host system blade and routing in accordance with one illustrative embodiment.

FIG. 17 is a flowchart outlining an example operation for performing priority group mapping and routing in accordance with one illustrative embodiment. As shown in FIG. 17, the operation starts with a privileged user, such as a system administrator, or automated mechanism creating traffic class (TC) to virtual channel (VC) mapping table data structure that assigns traffic classes (TCs) to virtual channels (VCs) in a single virtual hierarchy (VH) using the hardware management console (HMC), such as previously described above with regard to FIG. 13, for example (step 1710). The HMC passes the TC to VC mapping table data structure to the SR-PCIM by using the Remote Management Command interface 1002 in FIG. 10, for example (step 1720). The SR-PCIM configures the VC Resource Control Register with the TC to VC mappings using the PCI Express configuration bit fields as shown in FIG. 15, for example (step 1730). The VCs are arbitrated based on strict scheduling, round robin, or weighted round robin depending on how the SR-PCIM programs the VC. The operation outlined above with regard to steps 1710-1730 is repeated for each SR-IOV system by determining if there are additional SR-IOV systems to configure (step 1740) and if so, returning to step 1710 for the next SR-IOV system, with each SR-IOV system represents a virtual hierarchy (VH) in the MR-IOV system.

Once each SR-IOV system's TC to VC mapping table data structure is defined in the manner set forth above, the privileged user, e.g., system administrator, or automated mechanism assigns each VH/VC pair to a separate virtual link (VL) in a VH/VC pair to VL mapping table data structure using the HMC (step 1750). This results in prioritized groups per host blade since the VLs are associated with priority groups per host blade as shown in FIG. 14. The HMC passes this VH/VC pair to VL mapping table data structure, defining priority group mappings, to the MR-PCIM by using the Remote Management Command interface 1002 in FIG. 10, for example (step 1760). The MR-PCIM configures the function VC to VL Map from the MR-IOV Device Function Table mappings using the PCI Express configuration bits as shown in FIG. 16, for example (step 1770). The operation then ends.

Once the mappings are set up in accordance with the mechanisms of the illustrative embodiments, these mappings are utilized to route data of particular traffic classes to the appropriate virtual links in accordance with the priority groupings. For example, in one illustrative embodiment, the HMC 1009 in FIG. 10 has the priority grouping mappings per host blade of the illustrative embodiments, e.g., the mappings shown in FIGS. 13 and 14. The RMC interface 1002, for example, may then be used to transfer data to the PCIM 1003. The HMC 1009 may be a single management interface that, via the RMC interface 1002, may transfer data to the MR-PCIM or each individual SR-PCIM. The SR-PCIM or MR-PCIM may then write the configuration data into the PCI Express configuration space in the endpoint and/or switches It should be appreciated that the function VC to VL Map is configured per VH. However, for simplicity in this example, the bit fields are the same for each VH. The VLs are arbitrated based on a strict priority scheme, or other scheduling schemes including round robin and weighted queuing, depending upon how the MR-PCIM programs them.

Thus, the illustrative embodiments provide mechanisms for differentiating traffic types within a multi-root environment so that higher priority threads are not blocked by lower priority threads due to head of line blocking. The mechanisms of the illustrative embodiments provide a system and method to assign priority groups to virtual links in order to provide traffic differentiation and prevent slower traffic, like storage, from blocking more latency sensitive traffic like HPC applications. The illustrative embodiments define a mechanism to differentiate traffic types across virtual hierarchies using a traffic class, to virtual channel, to virtual link mapping capability. Each virtual hierarchy of the multi-root system may assign a single virtual channel to a virtual link. Multiple traffic types sharing a single virtual link could result in head of line blocking. For example the storage traffic could block the HPC traffic on a virtual link. Further the said storage traffic might be from a different virtual hierarchy than said HPC traffic. Thus traffic with longer transfer times could block traffic that requires lower latency and the slower traffic blocking the virtual link could be from a different virtual hierarchy. The illustrative embodiments define a system and method to assign priority groups to traffic classes, virtual channels and virtual links in order to prevent slower traffic like storage from blocking more latency sensitive traffic like HPC applications.

As noted above, it should be appreciated that aspects of the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for differentiating between different traffic types comprising:
    generating a first mapping data structure that, for each single-root virtual hierarchy in a plurality of single-root virtual hierarchies of the data processing system, associates each traffic class in a plurality of traffic classes with a corresponding priority group in a plurality of priority groups and a corresponding virtual channel in a plurality of virtual channels;
    generating a second mapping data structure that maps each virtual channel in the plurality of virtual channels to a corresponding virtual link in a plurality of virtual links of the data processing system; and
    routing traffic of a particular priority group from a single-root virtual hierarchy of the plurality of single root virtual hierarchies to a particular virtual link in the plurality of the virtual links based on the first mapping data structure and second mapping data structure, wherein each combination of a single-root virtual hierarchy of the plurality of single-root virtual hierarchy and virtual channel is mapped to a different virtual link in the plurality of virtual links, wherein routing traffic from the single-root virtual hierarchy to the particular virtual link in the plurality of the virtual links based on the first mapping data structure and second mapping data structure comprises:
        determining a traffic class associated with the traffic;
        performing a lookup operation in the first mapping data structure to identify a virtual channel corresponding to the particular priority group of the traffic, the priority group of the traffic corresponding to a combination of the single-root virtual hierarchy and the traffic class of the traffic;
        performing a lookup operation in the second mapping data structure to identify a virtual link associated with the virtual channel and single-root virtual hierarchy of the traffic; and
        routing the traffic to the identified virtual link.

2. The method of claim 1, wherein the first mapping data structure and second mapping data structure are generated by a hardware management console of the data processing system.

3. The method of claim 2, wherein the hardware management console configures one or more communication fabric managers of a host system based on the first mapping data structure and second mapping data structure.

4. The method of claim 1, wherein the data processing system is a multi-root data processing system having a plurality of single-root virtual hierarchies.

5. The method of claim 4, wherein the first mapping data structure and second mapping data structure route data from each single-root virtual hierarchy, in the plurality of single-root virtual hierarchies, to a different virtual link in the plurality of virtual links based on a combination of an identifier of the single-root virtual hierarchy and a virtual channel in a plurality of virtual channels associated with the single-root virtual hierarchy identified by the identifier.

6. The method of claim 1, wherein, for a single-root virtual hierarchy, within the first mapping data structure, a same virtual channel corresponds to a same priority group, and wherein the same virtual channel has one or more traffic classes associated with the same virtual channel.

7. The method of claim 6, wherein the single-root virtual hierarchy is associated with a host system blade of a blade server.

8. The method of claim 1, wherein the method is implemented by a Peripheral Component Interconnect (PCI) Express management component of a host system blade in a blade server.

9. The method of claim 8, wherein the PCI Express management component is one of a single-root PCI Express management component or a multi-root PCI Express management component.

10. A computer program product comprising a non-transitory computer recordable medium having a computer readable program recorded thereon, wherein the computer readable program, when executed on a data processing system, causes the data processing system to:
    generate a first mapping data structure that, for each single-root virtual hierarchy in a plurality of single-root virtual hierarchies of the data processing system, associates each traffic class in a plurality of traffic classes with a corresponding priority group in a plurality of priority groups and a corresponding virtual channel in a plurality of virtual channels;
    generate a second mapping data structure that maps each virtual channel in the plurality of virtual channels to a corresponding virtual link in a plurality of virtual links of the data processing system; and
    route traffic of a particular priority group from a single-root virtual hierarchy of the plurality of single root virtual hierarchies to a particular virtual link in the plurality of the virtual links based on the first mapping data structure and second mapping data structure, wherein each combination of a single-root virtual hierarchy of the plurality of single-root virtual hierarchy and virtual channel is mapped to a different virtual link in the plurality of virtual links, wherein routing traffic from the single-root virtual hierarchy to the particular virtual link in the plurality of the virtual links based on the first mapping data structure and second mapping data structure comprises:
        determining a traffic class associated with the traffic;
        performing a lookup operation in the first mapping data structure to identify a virtual channel corresponding to the particular priority group of the traffic, the priority group of the traffic corresponding to a combination of the single-root virtual hierarchy and the traffic class of the traffic;
        performing a lookup operation in the second mapping data structure to identify a virtual link associated with the virtual channel and single-root virtual hierarchy of the traffic; and
        routing the traffic to the identified virtual link.

11. The computer program product of claim 10, wherein the first mapping data structure and second mapping data structure are generated by a hardware management console of the data processing system.

12. The computer program product of claim 11, wherein the hardware management console configures one or more communication fabric managers of a host system based on the first mapping data structure and second mapping data structure.

13. The computer program product of claim 10, wherein the data processing system is a multi-root data processing system having a plurality of single-root virtual hierarchies.

14. The computer program product of claim 13, wherein the first mapping data structure and second mapping data structure route data from each single-root virtual hierarchy, in the plurality of single-root virtual hierarchies, to a different virtual link in the plurality of virtual links based on a combination of an identifier of the single-root virtual hierarchy and a virtual channel in a plurality of virtual channels associated with the single-root virtual hierarchy identified by the identifier.

15. The computer program product of claim 10, wherein, for a single-root virtual hierarchy, within the first mapping data structure, a same virtual channel corresponds to a same priority group, and wherein the same virtual channel has one or more traffic classes associated with the same virtual channel.

16. The computer program product of claim 15, wherein the single-root virtual hierarchy is associated with a host system blade of a blade server.

17. The computer program product of claim 10, wherein the computer readable program is executed in a Peripheral Component Interconnect (PCI) Express management component of a host system blade of a blade server.

18. A data processing system, comprising:
a hardware management console; and
a host system coupled to the hardware management console, wherein the hardware management console:
generates a first mapping data structure that, for each single-root virtual hierarchy in a plurality of single-root virtual hierarchies of the data processing system, associates each traffic class in a plurality of traffic classes with a corresponding priority group in a plurality of priority groups and a corresponding virtual channel in a plurality of virtual channels;
generates a second mapping data structure that maps each virtual channel in the plurality of virtual channels to a corresponding virtual link in a plurality of virtual links of the data processing system; and
routes traffic of a particular priority group from a single-root virtual hierarchy of the plurality of single root virtual hierarchies to a particular virtual link in the plurality of the virtual links based on the first mapping data structure and second mapping data structure, wherein each combination of a single-root virtual hierarchy of the plurality of single-root virtual hierarchy and virtual channel is mapped to a different virtual link in the plurality of virtual links, wherein routing traffic from the single-root virtual hierarchy to the particular virtual link in the plurality of the virtual links based on the first mapping data structure and second mapping data structure comprises:
determining a traffic class associated with the traffic;
performing a lookup operation in the first mapping data structure to identify a virtual channel corresponding to the particular priority group of the traffic, the priority group of the traffic corresponding to a combination of the single-root virtual hierarchy and the traffic class of the traffic;
performing a lookup operation in the second mapping data structure to identify a virtual link associated with the virtual channel and single-root virtual hierarchy of the traffic; and
routing the traffic to the identified virtual link.

* * * * *